(12) United States Patent
Kim et al.

(10) Patent No.: US 8,306,342 B2
(45) Date of Patent: Nov. 6, 2012

(54) METHOD AND APPARATUS TO ENCODE/DECODE IMAGE EFFICIENTLY

(75) Inventors: Dae-hee Kim, Suwon-si (KR); Woong-il Choi, Hwaseong-si (KR); Dae-sung Cho, Seoul (KR); Hyun-mun Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1084 days.

(21) Appl. No.: 12/230,245

(22) Filed: Aug. 26, 2008

(65) Prior Publication Data

US 2009/0196515 A1 Aug. 6, 2009

(30) Foreign Application Priority Data

Feb. 5, 2008 (KR) .................. 10-2008-0011916

(51) Int. Cl.
*G06K 9/36* (2006.01)
(52) U.S. Cl. ..... 382/236; 382/232; 382/240; 375/240.1; 375/240.16
(58) Field of Classification Search .......... 382/232, 382/233, 236, 240; 375/240.01, 240.03, 375/240.14, 240.15, 240.16, 122; 348/400, 348/384.1; 345/55
See application file for complete search history.

(56) References Cited

U.S. PATENT DOCUMENTS

| | | | | |
|---|---|---|---|---|
| 5,719,627 A * | 2/1998 | Ohta | ........................ | 348/398.1 |
| 2003/0215014 A1 | 11/2003 | Koto et al. | | |
| 2005/0117646 A1 | 6/2005 | Joch et al. | | |
| 2006/0165302 A1 * | 7/2006 | Han et al. | ........................ | 382/240 |
| 2006/0222074 A1 * | 10/2006 | Zhang | ........................ | 375/240.16 |
| 2006/0291562 A1 * | 12/2006 | Lee et al. | ........................ | 375/240.16 |
| 2007/0047653 A1 * | 3/2007 | Kim et al. | ........................ | 375/240.16 |
| 2008/0063072 A1 | 3/2008 | Suzuki et al. | | |

OTHER PUBLICATIONS

Koto S-I et al., "Adaptive B1-predictive video coding using temporal extrapolation", Proceedings 2003 International Conference on image Processing (CAT. No. 03CH37429), Barcelona, Spain, Sep. 14-17, 2003, vol. 3, p. 830-831.
Schwarz H et al., "Overview of the Scalable Video Coding Extension of the H.264/AVC Standard", IEEE Transactions on Circuits and Systems for Video Technology, IEEE Service Center, Piscataway, NJ, vol. 17, No. 9, Sep. 1, 2007, pp. 1103-1120.
European Search Report dated Aug. 12, 2010 and issued in corresponding European Patent Application 08171498.2.

* cited by examiner

*Primary Examiner* — Ali Bayat
(74) *Attorney, Agent, or Firm* — Staas & Halsey LLP

(57) ABSTRACT

A method of and apparatus to efficiently encode and/or decode an image are provided. The method of encoding an image includes: calculating a motion vector of a main reference image by estimating a motion of a current image with reference to the main reference image; deriving a motion vector of at least one auxiliary reference image from this motion vector; generating a prediction image of the current image by using a motion vector of the main reference image or the motion vector of the at least one auxiliary reference image; and encoding a residue image between the current image and the prediction image.

3 Claims, 18 Drawing Sheets

FIG. 5

| | |
|---|---|
| Motion MV | MOTION VECTOR INFORMATION OF MAIN REFERENCE IMAGE |
| | |
| Bool_MVScaling | BOOL-TYPE VARIABLE INDICATING WHETHER OR NOT MOTION VECTOR IS DERIVED |
| If(Bool_MVScaling == TRUE) { | CONFIRMATION OF WHETHER OR NOT MOTION VECTOR IS DERIVED |
| Bool_next | BOOL-TYPE VARIABLE INDICATING POSITION OF AUXILIARY REFERENCE IMAGE |
| } | |

METHOD AND APPARATUS TO ENCODE/DECODE IMAGE EFFICIENTLY

CROSS-REFERENCE TO RELATED APPLICATIONS

This application claims the benefit of Korean Patent Application No. 10-2008-0011916, filed on Feb. 5, 2008, in the Korean Intellectual Property Office, the disclosure of which is incorporated herein in its entirety by reference.

BACKGROUND

1. Field

One or more embodiments relate to a method of and apparatus to encode and/or decode an image, and more particularly, to a method of and apparatus to efficiently encode and/or decode an image.

2. Description of the Related Art

A codec which is currently widely used can reproduce a 4:2:0 image or an image having a bit depth of 8 bits. Meanwhile, research activities on new codecs capable of reproducing an image having high picture quality in which an image format is enhanced to 4:4:4 or 4:2:2 or the bit depth is enhanced to 10 bits have been actively carried out. However, a terminal in which the conventional codec capable of reproducing a 4:2:0 image or an image having a bit depth of 8 bits is mounted cannot reproduce a 4:4:4 image, or a 4:2:2 image or an image having a bit depth of 10 bits. If the 4:4:4 image or 4:2:2 image or the image having a bit depth of 10 bits are generally used, the terminals having the conventional codec will be useless. Accordingly, demands for a technology enabling a single stream (universal stream) to be reproduced both in a terminal with the conventional codec and in a terminal with a new codec have been greatly increasing.

SUMMARY

One or more embodiments includes a method of and apparatus enabling efficient processing of motion estimation of an image and allowing a single stream to be reproduced both in a terminal in which a conventional codec is mounted and in a terminal in which a new codec is mounted.

One or more embodiments correspondingly include a computer-readable recording medium having embodied thereon a computer program to execute the method.

Additional aspects and/or advantages will be set forth in part in the description which follows and, in part, will be apparent from the description, or may be learned by practice of the invention.

To achieve the above and/or other aspects and advantages, one or more embodiments may include a first method of encoding an image, the method including: calculating a motion vector of a main reference image by estimating a motion of a current image with reference to the main reference image; deriving a motion vector of at least one auxiliary reference image from the calculated motion vector of the main reference image; generating a prediction image of the current image by using the motion vector of the main reference image or the motion vector of the at least one auxiliary reference image; and encoding a residue image between the current image and the generated prediction image.

To achieve the above and/or other aspects and advantages, one or more embodiments may include a computer-readable recording medium having embodied thereon a computer program to execute the first image encoding method.

To achieve the above and/or other aspects and advantages, one or more embodiments may include a first apparatus to encode an image, the apparatus including: a motion estimation unit calculating a motion vector of a main reference image by estimating a motion of a current image with reference to the main reference image and deriving a motion vector of at least one auxiliary reference image from the calculated motion vector; a motion compensation unit generating a prediction image of the current image by using the motion vector of the main reference image or the motion vector of the at least one auxiliary reference image; and an encoding unit encoding a residue image between the current image and the generated prediction image.

To achieve the above and/or other aspects and advantages, one or more embodiments may include a first method of decoding an image, the method including: restoring a residue image between a current image and a prediction image from a bitstream; deriving a motion vector of an auxiliary reference image from a motion vector of a main reference image from among reference images of the current image; generating a prediction image of the current image by using the motion vector of the main reference image or the motion vector of the auxiliary reference image; and restoring the current image by adding the restored residue image to the generated prediction image.

To achieve the above and/or other aspects and advantages, one or more embodiments may include a computer-readable recording medium having embodied thereon a computer program to execute the first image decoding method.

To achieve the above and/or other aspects and advantages, one or more embodiments may include a first apparatus to decode an image, the apparatus including: a decoding unit restoring a residue image between a current image and a prediction image from a bitstream; a motion compensation unit deriving a motion vector of an auxiliary reference image from a motion vector of a main reference image from among reference images of the current image; and generating a prediction image of the current image by using the motion vector of the main reference image or the motion vector of the auxiliary reference image; and an adder restoring the current image by adding the restored residue image to the generated prediction image.

To achieve the above and/or other aspects and advantages, one or more embodiments may include a second method of encoding an image, the method including: calculating a motion vector of a main reference field by estimating a motion of a current field corresponding to half of a current image with reference to the main reference field; deriving a motion vector of at least one auxiliary reference field from the calculated motion vector of the main reference field; generating a prediction field of the current field by using the motion vector of the main reference field or the motion vector of the at least one auxiliary reference field; and encoding a residue field between the current field and the generated prediction field.

To achieve the above and/or other aspects and advantages, one or more embodiments may include a computer-readable recording medium having embodied thereon a computer program to execute the second image encoding method.

To achieve the above and/or other aspects and advantages, one or more embodiments may include a second apparatus to encode an image, the apparatus including: a motion estimation unit calculating a motion vector of a main reference field by estimating a motion of a current field corresponding to half of a current image with reference to the main reference field and deriving a motion vector of at least one auxiliary reference field from the calculated motion vector; a motion compensation unit generating a prediction field of the current field by using the motion vector of the main reference field or the motion vector of the at least one auxiliary reference field; and an encoding unit encoding a residue field between the current field and the generated prediction field.

To achieve the above and/or other aspects and advantages, one or more embodiments may include a second method of decoding an image, the method including: restoring a residue field between a current field corresponding to half of a current image and a prediction field from a bitstream; deriving a motion vector of an auxiliary reference field from a motion vector of a main reference field from among reference fields of the current field; generating a prediction field of the current field by using the motion vector of the main reference field or the motion vector of the auxiliary reference field; and restoring the current field by adding the restored residue field to the generated prediction field.

To achieve the above and/or other aspects and advantages, one or more embodiments may include a computer-readable recording medium having embodied thereon a computer program to execute the second image decoding method.

To achieve the above and/or other aspects and advantages, one or more embodiments may include a second apparatus of decoding an image, the apparatus including: a decoding unit restoring a residue field between a current field corresponding to half of a current image and a prediction field from a bitstream; a motion compensation unit deriving a motion vector of an auxiliary reference field from a motion vector of a main reference field from among reference fields of the current field, and generating a prediction field of the current field by using the motion vector of the main reference field or the motion vector of the auxiliary reference field; and an adder restoring the current field by adding the restored residue field to the generated prediction field.

To achieve the above and/or other aspects and advantages, one or more embodiments may include a first method of encoding an image in an upper layer, the method including: calculating a motion vector of a main reference image by estimating a motion of a first residue image between an original image and a restoration image from a base layer with reference to the main reference image; deriving a motion vector of at least one auxiliary reference image from the calculated motion vector of the main reference image; generating a prediction image of the first residue image by using the motion vector of the main reference image or the motion vector of the auxiliary reference image; and encoding a second residue image between the first residue image and the generated prediction image.

To achieve the above and/or other aspects and advantages, one or more embodiments may include a computer-readable recording medium having embodied thereon a computer program to execute the first method of encoding an image in an upper layer.

To achieve the above and/or other aspects and advantages, one or more embodiments may include a first apparatus to encode an image in an upper layer, the apparatus including: a motion estimation unit calculating a motion vector of a main reference image by estimating a motion of a first residue image between an original image and a restoration image from a base layer with reference to the main reference image, and deriving a motion vector of at least one auxiliary reference image from the calculated motion vector; a motion compensation unit generating a prediction image of the first residue image by using the motion vector of the main reference image or the motion vector of the at least one auxiliary reference image; and an encoding unit encoding a second residue image between the first residue image and the generated prediction image.

To achieve the above and/or other aspects and advantages, one or more embodiments may include a first method of decoding an image in an upper layer, the method including: restoring a second residue image between a first residue image of an original image and a prediction image from a bitstream; deriving a motion vector of an auxiliary reference image from a motion vector of a main reference image from among reference images of the first residue image; generating a prediction image of the first residue image by using the motion vector of the main reference image or the motion vector of the auxiliary reference image; and restoring the first residue image by adding the restored second residue image to the generated prediction image.

To achieve the above and/or other aspects and advantages, one or more embodiments may include a computer-readable recording medium having embodied thereon a computer program to execute the first method of decoding an image in an upper layer.

To achieve the above and/or other aspects and advantages, one or more embodiments may include a first apparatus to decode an image in an upper layer, the apparatus including: a decoding unit restoring a second residue image between a first residue image of an original image and a prediction image from a bitstream; a motion compensation unit deriving a motion vector of an auxiliary reference image from a motion vector of a main reference image from among reference images of the first residue image, and generating a prediction image of the first residue image by using the motion vector of the main reference image or the motion vector of the auxiliary reference image; and an adder restoring the first residue image by adding the restored second residue image to the generated prediction image.

To achieve the above and/or other aspects and advantages, one or more embodiments may include a second method of encoding an image in an upper layer, the method including: calculating a motion vector of a main reference field by estimating a motion of a first residue field between an original field and a restoration field from a base layer with reference to the main reference field; deriving a motion vector of at least one auxiliary reference field from the calculated motion vector of the main reference field; generating a prediction field of the first residue field by using the motion vector of the main reference field or the motion vector of the at least one auxiliary reference field; and encoding a second residue field between the first residue field and the generated prediction field.

To achieve the above and/or other aspects and advantages, one or more embodiments may include a computer-readable recording medium having embodied thereon a computer program to execute the second method of encoding an image in an upper layer.

To achieve the above and/or other aspects and advantages, one or more embodiments may include a second apparatus to encode an image in an upper layer, the apparatus including: a motion estimation unit calculating a motion vector of a main reference field by estimating a motion of the first residue field between an original field and a restoration field from a base layer with reference to the main reference field, and deriving a motion vector of at least one auxiliary reference field from the calculated motion vector; a motion compensation unit generating a prediction field of the first residue field by using the motion vector of the main reference field or the motion vector of the at least one auxiliary reference field; and an encoding unit encoding a second residue field between the first residue field and the generated prediction field.

To achieve the above and/or other aspects and advantages, one or more embodiments may include a second method of decoding an image in an upper layer, the method including: restoring a second residue field between a first residue field of an original field and a prediction field from a bitstream; deriving a motion vector of an auxiliary reference field from a motion vector of a main reference field from among reference fields of the first residue field; generating a prediction field of the first residue field by using the motion vector of the main reference field or the motion vector of the auxiliary reference field; and restoring the first residue field by adding the restored second residue field to the generated prediction field.

To achieve the above and/or other aspects and advantages, one or more embodiments may include a computer-readable recording medium having embodied thereon a computer program to execute the second method of decoding an image in an upper layer.

To achieve the above and/or other aspects and advantages, one or more embodiments may include a second apparatus to decode an image in an upper layer, the apparatus including: a decoding unit restoring a second residue field between a first residue field of an original field and a prediction field from a bitstream; a motion compensation unit deriving a motion vector of an auxiliary reference field from a motion vector of a main reference field from among reference fields of the first residue field, and generating a prediction field of the first residue field by using the motion vector of the main reference field or the motion vector of the auxiliary reference field; and an adder restoring the first residue field by adding the restored second residue field to the generated prediction field.

To achieve the above and/or other aspects and advantages, one or more embodiments may include a method of encoding an image, including: deriving a motion vector of an auxiliary reference image from a motion vector of a main reference image by using temporal relationships between the main reference image and a current image and between the auxiliary reference image and the main reference image; generating a prediction image of the current image from one of the motion vectors of the main reference image and the auxiliary reference image; and generating a residue image between the current image and the prediction image using the generated prediction image.

BRIEF DESCRIPTION OF THE DRAWINGS

These and/or other aspects and advantages will become apparent and more readily appreciated from the following description of the embodiments, taken in conjunction with the accompanying drawings of which:

FIG. 5 is a diagram illustrating syntax of image decoding information according to an embodiment;

DETAILED DESCRIPTION OF EMBODIMENTS

Figure 1:
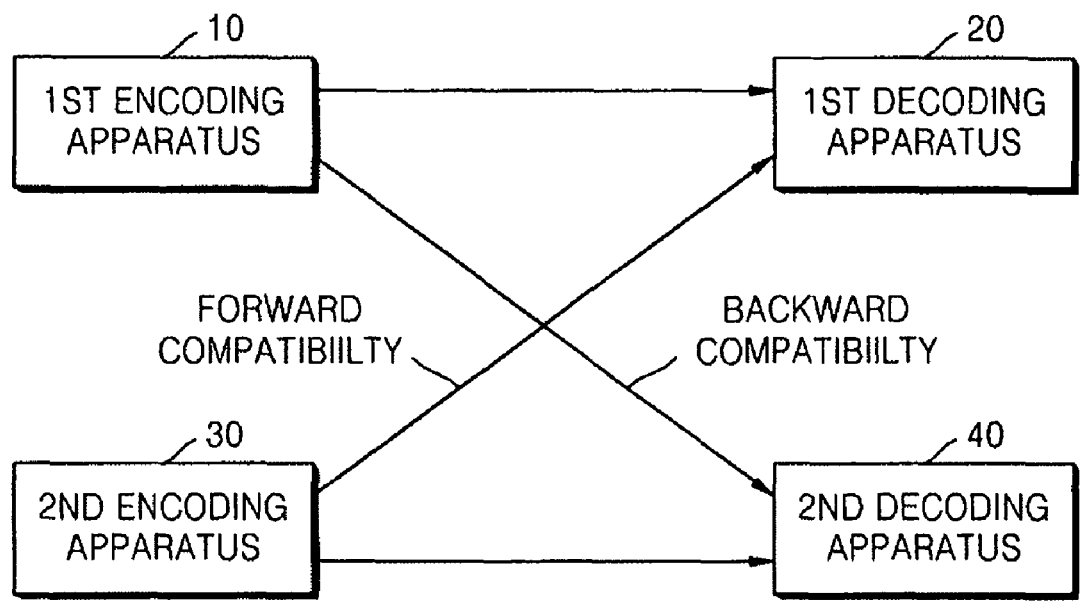
FIG. 1 is a diagram illustrating a scalable image processing environment to which embodiments are applied.

Reference will now be made in detail to embodiments, examples of which are illustrated in the accompanying drawings, wherein like reference numerals refer to the like elements throughout. In this regard, the embodiments of the present invention may be embodied in many different forms and should not be construed as being limited to embodiments set forth herein. Accordingly, the embodiments are merely described below, by referring to the figures, to explain aspects of the present invention. In particular, it can be understood by those skilled in the art that a term, "image," which is used hereinafter can be replaced by other terms having equivalent meanings, such as picture and frame, for example.

FIG. 1 is a diagram illustrating a scalable image processing environment to which embodiments are applied.

Referring to FIG. 1, the scalable image processing environment is formed with a first encoding apparatus 10, a first decoding apparatus 20, a second encoding apparatus 30 and a second decoding apparatus 40. The first encoding apparatus 10 and the first decoding apparatus 20 are apparatuses in which a conventional codec capable of reproducing a 4:2:0 image or an image having a bit depth of 8 bits is mounted, and the second encoding apparatus 30 and the second decoding apparatus 40 are apparatuses in which a new codec capable of reproducing a 4:4:4 image or 4:2:2 image or an image having a bit depth of 10 bits is mounted.

Accordingly, the first encoding apparatus 10 encodes a 4:2:0 image or an image having a bit depth of 8 bits, and outputs a bitstream corresponding to the encoding result. Also, the second encoding apparatus 30 encodes a 4:4:4 image or 4:2:2 image or an image having a bit depth of 10 bits, and outputs a bitstream corresponding to the encoding result. Compatibility by which the first decoding apparatus 20, in which the conventional codec is mounted, can reproduce a bitstream output from the second encoding apparatus 30, in which the new codec is mounted, is referred to as forward compatibility. Also, compatibility by which the second decoding apparatus 40, in which the new codec is mounted, can reproduce a bitstream output from the first encoding apparatus 10, in which the conventional codec is mounted, is referred to as backward compatibility. In particular, the embodiments which will now be explained support forward compatibility.

Figure 2:
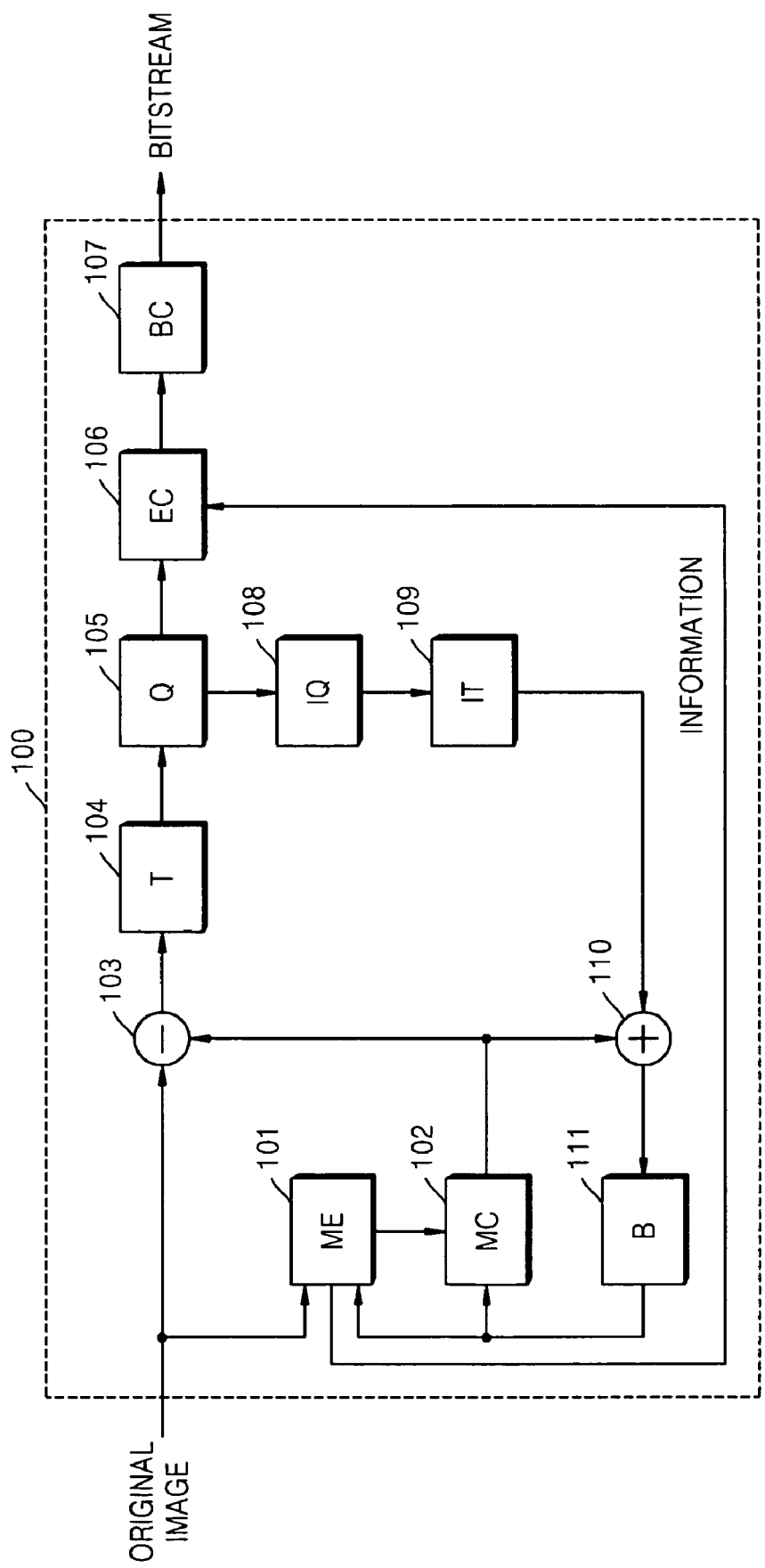
FIG. 2 is a diagram illustrating a structure of an image encoding apparatus according to an embodiment.

FIG. 2 is a diagram illustrating a structure of an image encoding apparatus according to an embodiment.

Referring to FIG. 2, the image encoding apparatus 100 according to the current embodiment includes a motion estimation unit 101, a motion compensation unit 102, a first subtracter 103, a first transform unit 104, a quantization unit 105, an entropy encoding unit 106, a bitstream generation unit 107, an inverse quantization unit 108, an inverse transform unit 109, an adder 110, and a buffer 111. It is assumed that the size of a block corresponding to a processing unit of an image in the current embodiment is 16×16, which is most generally used. A block of this 16×16 size is also referred to as a macroblock. However, those skilled in the art of the current embodiment can understand that the size of a block may be a variety of sizes in addition to the 16×16 size.

In particular, encoding an image in the image encoding apparatus 100 illustrated in FIG. 2 will be divided into a case where encoding is performed according to a progressive scanning method and a case where encoding is performed according an interlace scanning method and explained. First, the case where an image is encoded in the apparatus 100 according to the progressive scanning method will now be explained. Progressive scanning is a method of sequentially displaying one image from the first part to the last part on a screen. Accordingly, a variety of types of images processed in the process of encoding an image according to the progressive scanning are complete images having identical shapes to those of images input to the image encoding apparatus 100.

The motion estimation unit 101 estimates motion of a currently input image (hereinafter simply referred to as a "current image") from among a series of images corresponding to moving pictures with reference to a main reference image from among reference images stored in the buffer 111, thereby calculating a motion vector of the main reference image. More specifically, the motion estimation unit 101 selects any one image from among the reference images stored in the buffer 111 as a main reference image, and determines a block of the main reference image which best matches each block forming the current block. Then the motion estimation unit 101 calculates a motion vector indicating the displacement between the determined block of the main reference image and the corresponding block of the current image. For example, the motion estimation unit 101 may select a reference image which best matches the current image as a whole, from among the reference images stored in the buffer 111, as a main reference image. Thus, the main reference image may be a reference image closest to the current image in time or another reference image.

Also, the motion estimation unit 101 selects at least one reference image within a predetermined temporal distance from the main reference image from among reference images stored in the buffer 111, as an auxiliary reference image, and linearly transforms the motion vector of the main reference image calculated as described above, thereby deriving a motion vector of the auxiliary reference image from the motion vector of the main reference image. More specifically, by using the relationship between the temporal distance between the main reference image and the current image and the temporal distance between the auxiliary reference image and the main reference image, the motion estimation unit 101 linearly transforms the motion vector of the main reference image, thereby deriving the motion vector of the auxiliary reference image. More specific processes of deriving a motion vector will be explained below in more detail.

Meanwhile, conventional image encoding methods calculate a motion vector of each reference image through a motion estimation process with each reference image stored in the buffer 111, that is, a process of searching for the best matched block in each reference image with a given block of the current image. Accordingly, as a number of reference images increases, the complexity of motion search process greatly increases, thereby making the methods very inefficient. According to the current embodiment, the motion searching process as described above is applied to only a main reference image, and motion vectors of other reference images can be simply derived by using equations described below from the motion vector of the main reference image. Accordingly, the process of acquiring motion vectors of a plurality of reference images becomes very simple and efficient.

Figure 3:
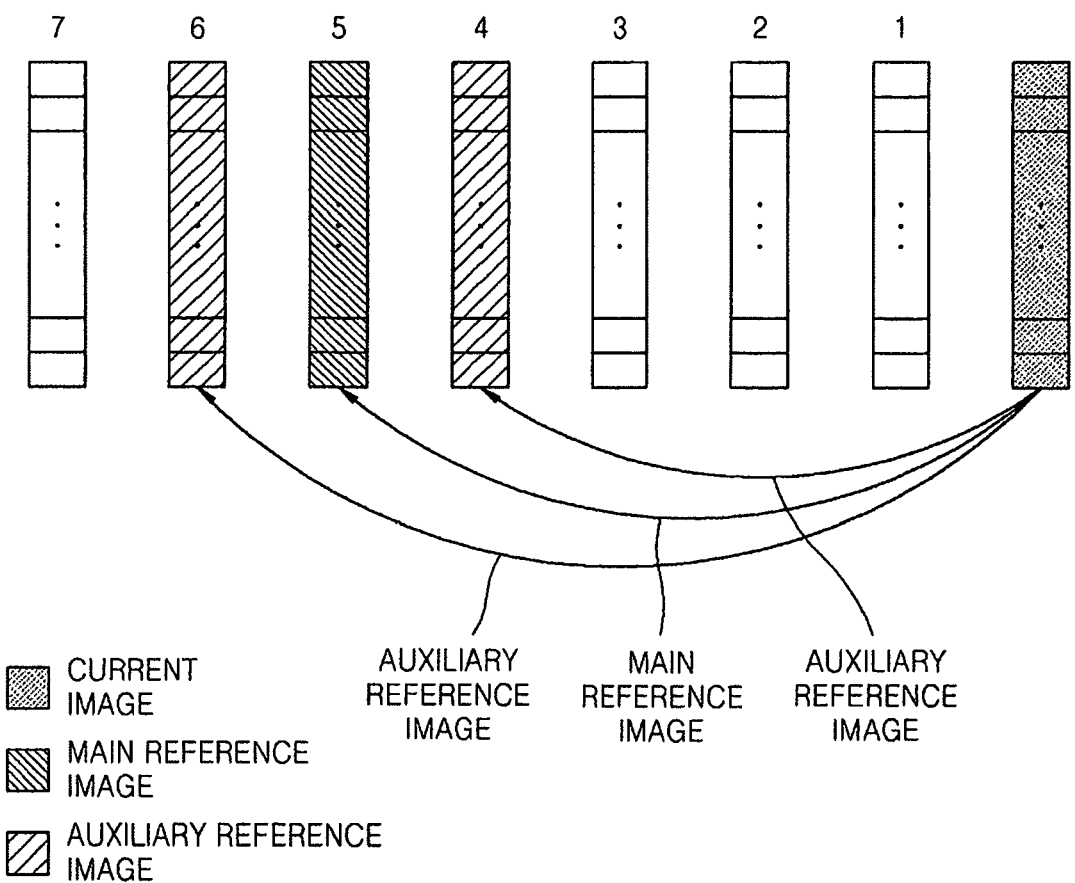
FIG. 3 is a diagram illustrating a relationship between a main reference image and auxiliary reference image in a progressive scanning method according to an embodiment.

FIG. 3 is a diagram illustrating the relationship between a main reference image and an auxiliary reference image in a progressive scanning method according to an embodiment.

Among the reference images illustrated in FIG. 3, the fifth reference image from a current image is selected as a main reference image, and if a criterion of selecting an auxiliary reference image is that an auxiliary reference image should be any one of two reference images closest to the main reference image, the motion estimation unit 101 selects the sixth reference image and the fourth reference image positioned before and after, respectively, this fifth reference image. Since the main reference image best matches the current image as a whole, it is highly probable that the sixth reference image and the fourth reference image positioned immediately before and after, respectively, the main reference image will match the current image because of temporal continuity of moving pictures. Though the motion estimation unit 101 selects the sixth and fourth reference images as auxiliary reference images in consideration of this characteristic, other reference images than these reference images may be selected as auxiliary reference images.

First, when the sixth reference image illustrated in FIG. 3 is selected as an auxiliary reference image, that is, when the auxiliary reference image is positioned temporally further than the main reference image from the current image, the motion estimation unit 101 may derive a motion vector of the auxiliary reference image according to Equation 1 below. In Equation 1 below, "MVrx" denotes a vertical component of the motion vector of the main reference image, "MVry" denotes a horizontal component of the motion vector of the main reference image, "INDEXref" denotes a temporal distance between the main reference image and the current image, "A" denotes a temporal distance between the auxiliary reference image and the main reference image, and "½INDEXref" denotes a value to round off the result value of Equation 1.

$$MV_{px} = \frac{MV_{rx} \cdot (INDEX_{ref} + A) + \frac{1}{2} INDEX_{ref}}{INDEX_{ref}} \quad (1)$$

$$MV_{py} = \frac{MV_{ry} \cdot (INDEX_{ref} + A) + \frac{1}{2} INDEX_{ref}}{INDEX_{ref}}$$

That is, when the auxiliary reference image is positioned farther than the main reference image from the current image, the motion estimation unit 101 derives a motion vector of the auxiliary reference image by multiplying the motion vector of the main reference image by a ratio of a sum of the temporal distance between the main reference image and the current image and the temporal distance between the auxiliary reference image and the main reference image, and to the temporal distance between the main reference image and the current image. Next, when the fourth reference image illustrated in FIG. 3 is selected as an auxiliary reference image, that is, when the auxiliary reference image is positioned temporally closer than the main reference image to the current image, the motion estimation unit 101 may derive a motion vector of the auxiliary reference image according to Equation 2 below. In Equation 2 below, "MVrx" denotes the vertical component of the motion vector of the main reference image, "MVry" denotes the horizontal component of the motion vector of the main reference image, "INDEXref" denotes the temporal distance between the main reference image and the current image, "B" denotes a temporal distance between the auxiliary reference image and the main reference image, and "½INDEXref" denotes a value to round off the result value of Equation 2.

$$MV_{nx} = \frac{MV_{rx} \cdot (INDEX_{ref} - B) + \frac{1}{2} INDEX_{ref}}{INDEX_{ref}} \quad (2)$$

$$MV_{ny} = \frac{MV_{ry} \cdot (INDEX_{ref} - B) + \frac{1}{2} INDEX_{ref}}{INDEX_{ref}}$$

That is, when the auxiliary reference image is positioned closer than the main reference image to the current image, the motion estimation unit 101 derives a motion vector of the auxiliary reference image by multiplying the motion vector of the main reference image by a ratio of a difference between the temporal distance between the main reference image and the current image and the temporal distance between the auxiliary reference image and the main reference image, to the temporal distance between the main reference image and the current image.

Figure 4:
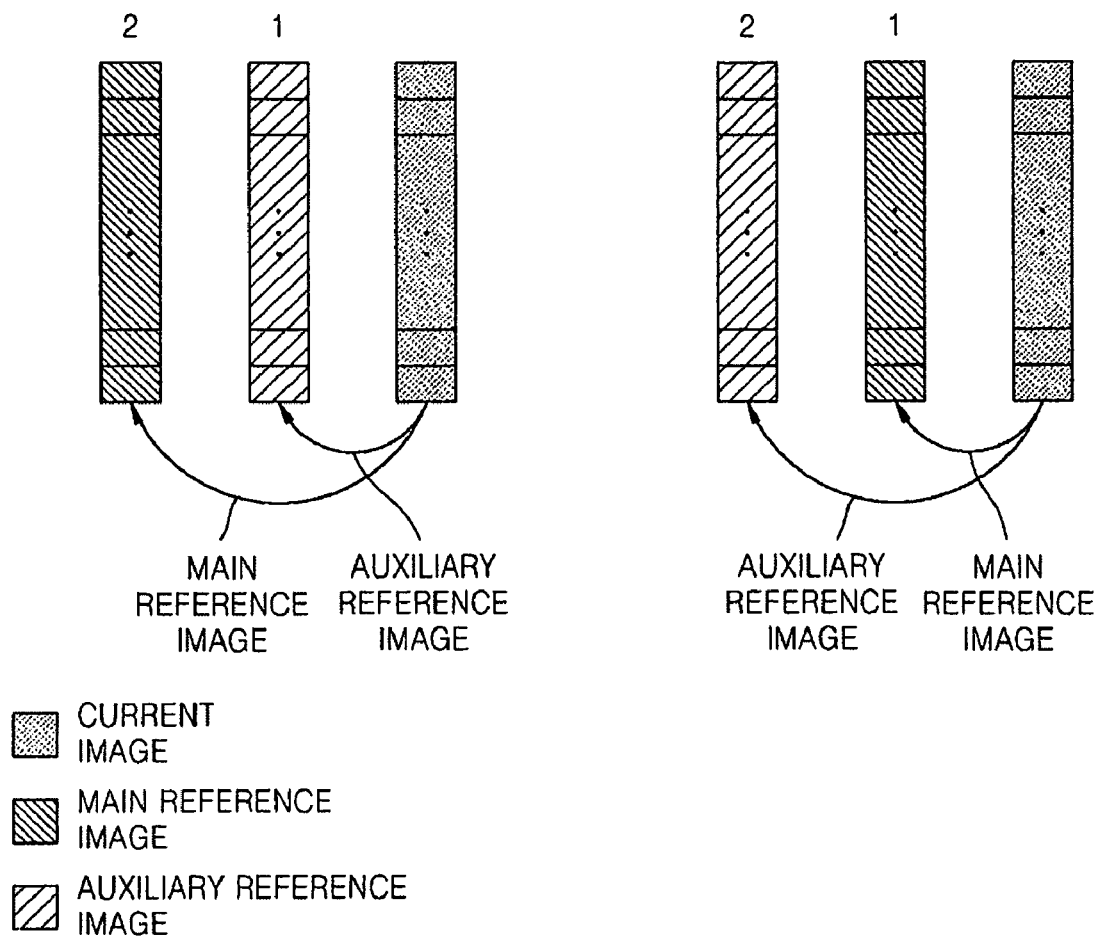
FIG. 4 is a diagram illustrating a case where only one auxiliary reference image exists according to an embodiment.

FIG. 4 is a diagram illustrating a case where only one auxiliary reference image exists according to an embodiment.

The case illustrated in FIG. 4 occurs when a capacity of the buffer 111 is enough to store only two reference images, or when a current image is the third image among a series of images corresponding to moving pictures. First, when the buffer 111 has the capacity enough to store only two reference images, any one of the two reference images should be a main reference image, and therefore only one auxiliary reference image can exist. Next, when a current image is the third image among a series of images corresponding to moving pictures, the number of images that are restored after image encoding processes are completed according to the current embodiment, that is, reference images, cannot be greater than two, and any one of the two should be a main reference image. Accordingly, only one reference image can exist.

Also, the motion estimation unit 101 compares a compression ratio of the current image according to the motion vector of the main reference image with a compression ratio of the current image according to the motion vector of the auxiliary reference image, and according to the comparison result, the motion estimation unit 101 selects any one of the motion vectors of the main reference image and the auxiliary reference image. That is, when the compression ratio of the current image according to the motion vector of the main reference image is higher than the compression ratio of the current image according to the motion vector of the auxiliary reference image, the motion estimation unit 101 selects the motion vector of the main reference image, and if the compression ratio of the current image according to the motion vector of the auxiliary reference image is higher than the compression ratio of the current image according to the motion vector of the main reference image, the motion estimation unit 101 selects the motion vector of the auxiliary reference image. More specifically, the motion estimation unit 101 compares a difference between a block in the main reference image and a block in the current image indicated by the motion vector of the main reference image with a difference between a block in the auxiliary reference image and a block in the current image indicated by the motion vector of the auxiliary reference image, and selects a motion vector having a smaller difference. The main reference image is a reference image best matching the current image as a whole. However, motion estimation of the current image is performed in units of blocks and in some blocks among the blocks forming the current image, other reference images may match the current image better than the main reference image.

The motion compensation unit 102 generates a prediction image of the current image from at least one reference image from among the reference images stored in the buffer 111 by using the motion vector of the main reference image or the motion vector of the auxiliary reference image selected by the motion estimation unit 101. More specifically, the motion compensation unit 102 determines the values of blocks of at least one reference image indicated by the main reference image or the auxiliary reference image selected by the motion estimation unit 101, as the values of the blocks of the current image, thereby generating the prediction image of the current image.

The image compression method by the motion estimation unit 101 and the motion compensation unit 102 described above is a method of compressing an image by using temporal redundancy of a plurality of images forming any one set of moving pictures and is referred to as an inter encoding method. A method of compressing an image by using spatial redundancy in any one image is referred to as an intra encoding method. In order to avoid making a long-winded explanation, the current embodiment is illustrated as one to which only the inter encoding method is applied. However, those skilled in the art of the current embodiment can understand that the intra encoding method can also be applied to the current embodiment. Also, the intra encoding method can also be applied to an image input to the image encoding apparatus 100, and can also be applied to a result converted by the transform unit 104.

The subtracter 103 generates a residue image between a current image and a prediction image by subtracting the prediction image generated by the motion compensation unit 102 from the current image. The transform unit 104 transforms the residue image generated by the subtracter 103 from a color space to a frequency space, thereby generating frequency coefficients of this residue image. For example, the transform unit 104 can transform the residue image generated by the subtracter 103 from the color space to the frequency space by using discrete Hadamard transform (DHT) and discrete cosine transform (DCT), for example.

The quantization unit 105 quantizes frequency coefficients generated by the transform unit 104. More specifically, the quantization unit 105 divides the frequency coefficients generated by the transform unit 104 by a quantization parameter, and approximates the results to integer values. The entropy encoding unit 106 entropy-encodes the integer values corresponding to the results quantized by the quantization unit 105 and the encoding information of the current image, thereby generating a bitstream. For example, the entropy encoding unit 106 can entropy-encode the integer values corresponding to the results quantized by the quantization unit 105 by using context-adaptive variable-length coding (CAVLC), and context-adaptive binary arithmetic coding (CAVAC), for example.

In this case, the encoding information of the current image is information generated in the image encoding process in the motion estimation unit 101 and other units, and is necessary when the current image is desired to be restored in an image decoding apparatus. Examples of this information may include an index of a reference image, and a motion vector. In particular, in an image decoding apparatus corresponding to the image encoding apparatus 100 according to the current embodiment, only the motion vector of a main reference image is transferred, and the motion vector of an auxiliary reference image is derived from the motion vector of the main reference image. Accordingly, in addition to the general information as described above, information to derive the motion vector of an auxiliary reference image is further required.

However, the image encoding apparatus 100 may directly transmit the index and motion vector of the auxiliary reference image to the image decoding apparatus without transmitting information to derive the motion vector of the auxiliary reference image. In this case, the process of deriving the motion vector of the auxiliary reference image in the image decoding apparatus is not necessary. In general, the amount of data to express the index and motion vector of an auxiliary reference image is big, and therefore it is more efficient for the image encoding apparatus 100 to transmit information to derive the motion vector of the auxiliary reference image to the image decoding apparatus.

FIG. 5 is a diagram illustrating syntax of image decoding information according to an embodiment. In particular, FIG. 5 illustrates syntax of information to derive a motion vector of an auxiliary reference image. That is, the entropy encoding unit 106 entropy-encodes a motion vector of a main reference image and the position of an auxiliary reference image that have the syntax as illustrated in FIG. 5. For example, if the distance between the auxiliary reference image and the main reference image is "1", that is, if the auxiliary reference image is any one of two reference images closest to the main reference image, the position of the auxiliary reference image can be expressed by "Bool_next" which is one bit long. That is, "Bool_next"=1 indicates an auxiliary reference image which is positioned one frame apart from the main reference image on the side closer to the current image, and "Bool_next"=2 indicates an auxiliary reference image which is positioned one frame apart from the main reference image on the side farther from the current image. In particular, if no motion vector of any auxiliary reference image is selected in the compression ratio comparison process in the motion estimation unit 101, the entropy encoding unit 106 entropy-encodes only the motion vector of the main reference image.

The inverse quantization unit 108 inverse-quantizes the integer values corresponding to the results quantized by the quantization unit 105, thereby restoring the frequency coefficients of the residue image between the current image and the prediction image. More specifically, the inverse quantization unit 108 multiplies the integer values approximated by the quantization unit 105 by a quantization parameter, thereby restoring the frequency coefficients of the residue image between the current image and the prediction image. The inverse transform unit 109 transforms the frequency coefficients restored by the inverse quantization unit 108 from the frequency space to the color space, thereby restoring the residue image between the current image and the prediction image. The adder 110 adds the residue image restored by the inverse transform unit 109 to the prediction image generated by the motion compensation unit 102, thereby generating a restoration image of the current image and storing this restoration image in the buffer 111. The restoration image currently stored in the buffer 111 is used as a reference image of a future image appearing after the current image or a past image existing before the current image.

Next, encoding an image in the image encoding apparatus 100 illustrated in FIG. 2 according to the interlace scanning method will now be explained. The interlace scanning method is a method by which one image is displayed on a screen by dividing one image into odd-numbered lines and even-numbered lines. That is, one image is divided into a top field formed by odd-numbered lines and a bottom field formed by even-numbered lines. Accordingly, a variety of types of images which are processed in the process of encoding an image according to the interlace scanning method correspond to half of the images input to the image encoding apparatus 100. However, except that an image is processed in units of fields unlike one whole image unit processed in the progressive scanning method, the process of encoding an image according to the interlace scanning method is similar to that of the progressive scanning method, and therefore only the different part of the interlace scanning method from the progressive scanning method will now be explained.

The motion estimation unit 101 estimates the motion of an image (hereinafter referred to a "current field") corresponding to half of a currently input image from among a series of images corresponding to moving pictures with reference to a main reference field among reference fields stored in the buffer 111, thereby calculating a motion vector of the main reference field. In this case, the current field is any one of the top field and the bottom field. Also, the motion estimation unit 101 selects at least one reference field within a predetermined temporal distance from the main reference field from among reference fields stored in the buffer 111 as an auxiliary reference field, and by linearly transforming the motion vector of the main reference field calculated as described above, the motion estimation unit 101 derives a motion vector of the auxiliary reference field from the motion vector of the main reference field.

In particular, if any one of the top field and bottom field of any reference image is selected as the main reference field, the motion estimation unit 101 reads this main reference field and the other field of this reference image at the same time, and by selecting the other field as the auxiliary reference field, the motion estimation unit 101 can reduce the times of access to the buffer 111. Also, if the bottom field of the currently input image is the current field, the motion estimation unit 101 may select the top field of this image as a main reference field or an auxiliary reference field. Since a top field is first displayed on a screen and the bottom field is displayed next on the screen according to the interlace scanning method, if the bottom field of an image is a current field, the encoding process of the top field of this image is already completed and the restoration field of this top field, i.e., a reference field, is already generated.

However, unlike the progressive scanning method, in the interlace scanning method, a case exists where there is a difference of one pixel in the vertical direction between a main reference field and an auxiliary reference field, that is, where a polarity of the main reference field is different from a polarity of the auxiliary reference field. For example, the main reference field has a top polarity and the auxiliary reference field has a bottom polarity, or the main reference field has a bottom polarity and the auxiliary reference field has a top polarity. Accordingly, when a motion vector of an auxiliary reference field is to be derived from a motion vector of a main reference field according to the interlace scanning method, this polarity difference between the main reference field and the auxiliary reference field should be considered. When the polarity of the main reference field is the same as the polarity of the auxiliary reference field, a motion vector of the auxiliary reference field can be derived from the motion vector of the main reference field in a manner similar to that of the progressive scanning method. That is, by using the relationship between the temporal distance between the main reference field and the current field and the temporal distance between the auxiliary reference field and the main reference field, and the polarity difference between the main reference field and the auxiliary reference field, the motion vector of the main reference field is linearly transformed, thereby deriving the motion vector of the auxiliary reference field. A more specific process of deriving a motion vector will now be explained in more detail.

Figure 6:
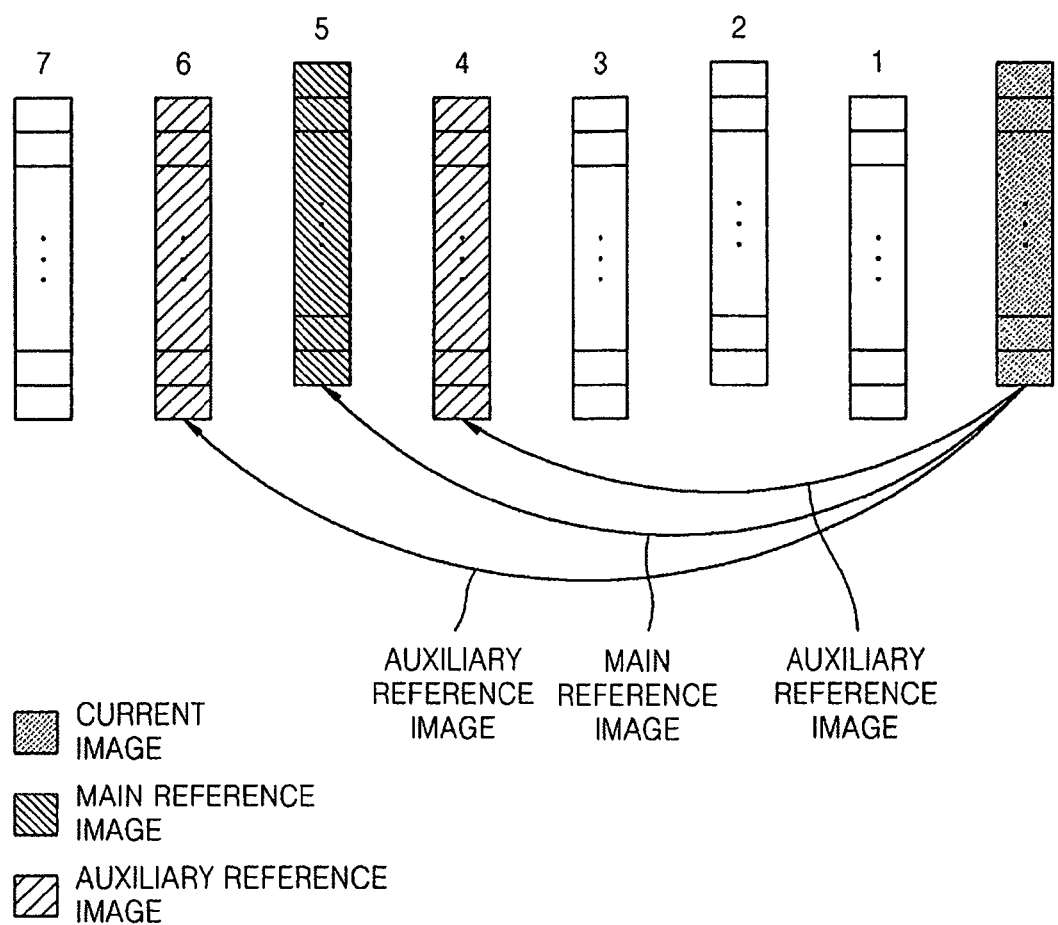
FIG. 6 is a diagram illustrating a case where a polarity of a current field and a polarity of a main reference field are identical to each other in an interlace scan method according to an embodiment.

FIG. 6 is a diagram illustrating a case where the polarity of a current field and the polarity of a main reference field are identical to each other in an interlace scan method according to an embodiment.

When a reference field which is the fifth reference field from a current field is selected as a main reference field from among reference fields illustrated in FIG. 6, and a criterion of selecting an auxiliary reference field is that the auxiliary reference field should be any one of two fields closest to the main reference field, the motion estimation unit 101 can select the sixth reference field and the fourth reference field positioned immediately before and after, respectively, the fifth reference field, as auxiliary reference fields.

First, when the sixth reference field illustrated in FIG. 6 is selected as the auxiliary reference field, that is, when the auxiliary reference field is positioned temporally farther than the main reference field from the current field, the motion estimation unit 101 may derive a motion vector of the auxiliary reference field according to Equation 3 below. In Equation 3 below, "MVrx" denotes the x component of the motion vector relative to the main reference field, "MVry" denotes the y component of the motion vector relative to the main reference field, "INDEXref" denotes the temporal distance between the main reference field and the current field, "A" denotes the temporal distance between the auxiliary reference field and the main reference field, and "½INDEXref" denotes a value to round off the result value of Equation 3.

$$MV_{px} = \frac{MV_{rx} \cdot (INDEX_{ref} + A) + \frac{1}{2} INDEX_{ref}}{INDEX_{ref}} \quad (3)$$

$$MV_{py} = \frac{MV_{ry} \cdot (INDEX_{ref} + A) + \frac{1}{2} INDEX_{ref}}{INDEX_{ref}} + \text{offset}$$

When the polarity of the current field is the same as the polarity of the main reference field and the auxiliary reference field is positioned temporally farther than the main reference field from the current field, the vertical component multiplication result in the multiplication result should be corrected. That is, when the polarity of the current field is the same as the polarity of the main reference field and the auxiliary reference field is positioned temporally farther than the main reference field from the current field, the motion estimation unit 101 multiplies the motion vector of the main reference field by the ratio of the sum of the temporal distance between the main reference field and the current field and the temporal distance between the auxiliary reference field and the main reference field to the temporal distance between the main reference field and the current field, and adds an offset to correct the polarity difference between the main reference field and the auxiliary reference field to the vertical component multiplication result in the multiplication result, thereby deriving the motion vector of the auxiliary reference field.

Since fields used in the image encoding process according to the interlace scanning method correspond to half of the original images, the magnitude of the offset to correct the polarity difference between the main reference field and the auxiliary reference field has a half pixel unit which is half the pixel unit forming the original image. In general, in order to precisely restore an image through image interpolation and the like, a motion vector is expressed in units of half pixels or quarter pixels. If a motion vector is expressed in units of half pixels in the current embodiment, the magnitude unit of the offset becomes 1. In this case, if the main reference field has a top polarity and the auxiliary reference field has a bottom polarity, as illustrated in FIG. 6, the offset becomes −1. Unlike those illustrated in FIG. 6, if the main reference field has a bottom polarity and the auxiliary reference field has a top polarity, the offset becomes +1. If a motion vector is expressed in units of quarter pixels in the current embodiment, the magnitude unit of the offset becomes 2. In this case, if the main reference field has a top polarity and the auxiliary reference field has a bottom polarity, as illustrated in FIG. 6, the offset becomes −2. Unlike those illustrated in FIG. 6, if the main reference field has a bottom polarity and the auxiliary reference field has a top polarity, the offset becomes +2.

Next, if the fourth reference field illustrated in FIG. 6 is selected as the auxiliary reference field, that is, when the auxiliary reference field is positioned temporally closer than the main reference field to the current field, the motion estimation unit 101 may derive a motion vector of the auxiliary reference field according to Equation 4 below. In Equation 4 below, "MVrx" denotes the x component of the motion vector relative to the main reference field, "MVry" denotes the y component of the motion vector relative to the main reference field, "INDEXref" denotes the temporal distance between the main reference field and the current field, "B" denotes the temporal distance between the auxiliary reference field and the main reference field, and "½INDEXref" denotes a value for rounding off the result value of Equation 4.

$$MV_{nx} = \frac{MV_{rx} \cdot (INDEX_{ref} - B) + \frac{1}{2} INDEX_{ref}}{INDEX_{ref}} \quad (4)$$

$$MV_{ny} = \frac{MV_{ry} \cdot (INDEX_{ref} - B) + \frac{1}{2} INDEX_{ref}}{INDEX_{ref}} + \text{offset}$$

When the polarity of the current field is the same as the polarity of the main reference field and the auxiliary reference field is positioned temporally closer than the main reference field to the current field, the vertical component multiplication result in the multiplication result should be corrected. That is, when the polarity of the current field is the same as the polarity of the main reference field and the auxiliary reference field is positioned temporally closer than the main reference field to the current field, the motion estimation unit 101 multiplies the motion vector of the main reference field by the ratio of the difference between the temporal distance between the main reference field and the current field and the temporal distance between the auxiliary reference field and the main reference field to the temporal distance between the main reference field and the current field, and adds an offset to correct the polarity difference between the main reference field and the auxiliary reference field to the vertical component multiplication result in the multiplication result, thereby deriving the motion vector of the auxiliary reference field. Since the offset value in Equation 4 is the same as that in Equation 3, explanation of the offset value in Equation 4 will be omitted here.

Figure 7:
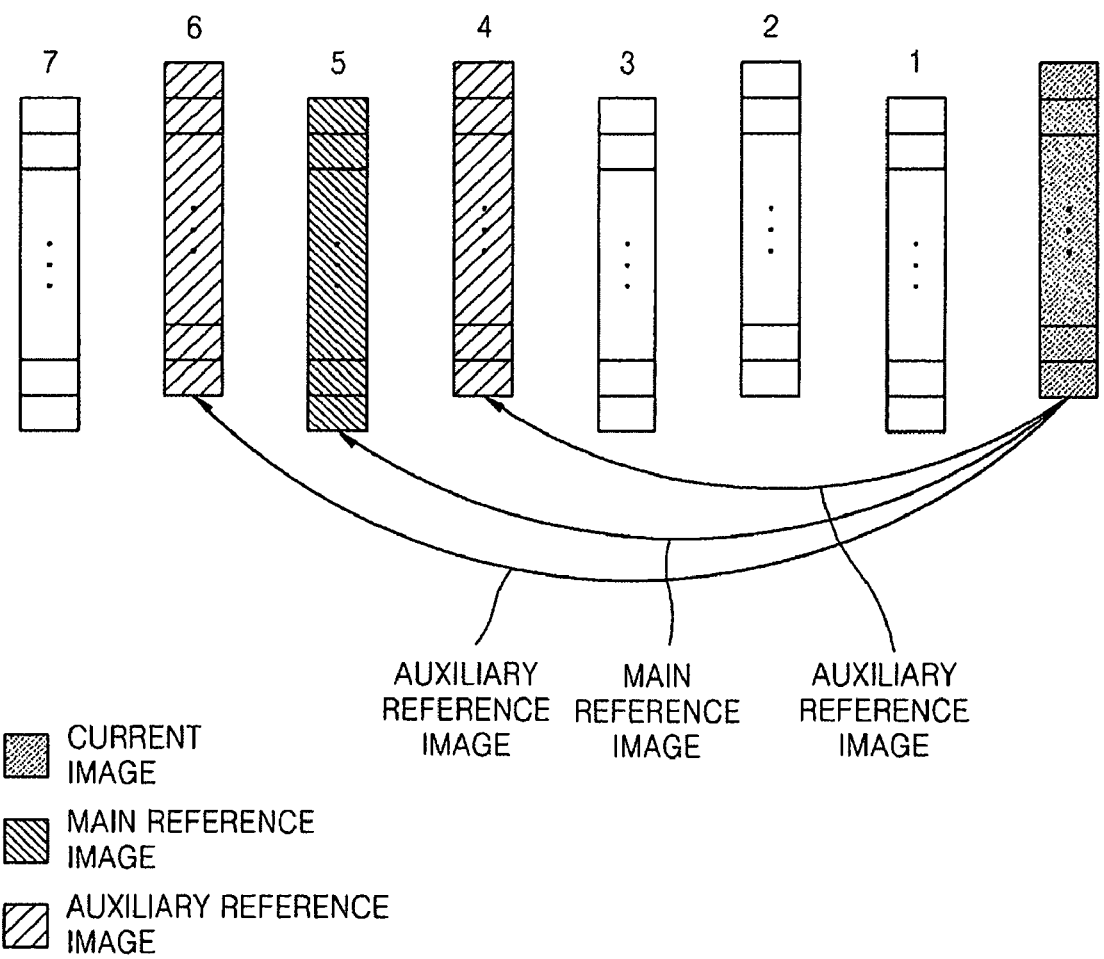
FIG. 7 is a diagram illustrating a case where a polarity of a current field and a polarity of a main reference field are different from each other in an interlace scan method according to an embodiment.

FIG. 7 is a diagram illustrating a case where the polarity of a current field and the polarity of a main reference field are different from each other in an interlace scan method according to an embodiment.

When a reference field which is the fifth reference field from a current field is selected as a main reference field from among reference fields illustrated in FIG. 7, and a criterion of selecting an auxiliary reference field is that the auxiliary reference field should be any one of two fields closest to the main reference field, the motion estimation unit 101 selects the sixth reference field and the fourth reference field positioned immediately before and after, respectively, the fifth reference field, as auxiliary reference fields.

First, when the sixth reference field illustrated in FIG. 7 is selected as the auxiliary reference field, that is, when the auxiliary reference field is positioned temporally farther than the main reference field from the current field, the motion estimation unit 101 may derive a motion vector of the auxiliary reference field according to Equation 5 below. In Equation 5 below, "MVrx" denotes the x component of the motion vector relative to the main reference field, "MVry" denotes the y component of the motion vector relative to the main reference field, "INDEXref" denotes the temporal distance between the main reference field and the current field, "A" denotes the temporal distance between the auxiliary reference field and the main reference field, and "½INDEXref" denotes a value to round off the result value of Equation 5.

$$MV_{px} = \frac{MV_{rx} \cdot (INDEX_{ref} + A) + \frac{1}{2} INDEX_{ref}}{INDEX_{ref}} \quad (5)$$

$$MV_{py} = \frac{(MV_{ry} + \text{offset}) \cdot (INDEX_{ref} + A) + \frac{1}{2} INDEX_{ref}}{INDEX_{ref}}$$

When the polarity of the current field is different from the polarity of the main reference field and the auxiliary reference field is positioned temporally farther than the main reference field from the current field, the vertical component multiplication result in the multiplication result should be corrected. That is, when the polarity of the current field is different from the polarity of the main reference field and the auxiliary reference field is positioned temporally farther than the main reference field from the current field, the motion estimation unit 101 adds an offset to correct the polarity difference between the current field and the main reference field to the motion vector of the main reference field, and multiplies the addition result by the ratio of the sum of the temporal distance between the main reference field and the current field and the temporal distance between the auxiliary reference field and the main reference field to the temporal distance between the main reference field and the current field, thereby deriving the motion vector of the auxiliary reference field.

If a motion vector in the current embodiment is expressed in units of half pixels, the magnitude of the offset becomes 1.

In this case, if the current field has a top polarity and the main reference field has a bottom polarity, as illustrated in FIG. 7, the offset becomes +1. Unlike those illustrated in FIG. 7, if the current field has a bottom polarity and the main reference field has a top polarity, the offset becomes −1. If a motion vector is expressed in units of quarter pixels in the current embodiment, the magnitude unit of the offset becomes 2. In this case, if the current field has a top polarity and the main reference field has a bottom polarity, as illustrated in FIG. 7, the offset becomes +2. Unlike those illustrated in FIG. 7, if the current field has a bottom polarity and the main reference field has a top polarity, the offset becomes −2.

Next, if the fourth reference field illustrated in FIG. 7 is selected as the auxiliary reference field, that is, when the auxiliary reference field is positioned temporally closer than the main reference field to the current field, the motion estimation unit 101 may derive a motion vector of the auxiliary reference field according to Equation 6 below. In equation 6 below, "MVrx" denotes the x component of the motion vector relative to the main reference field, "MVry" denotes the y component of the motion vector relative to the main reference field, "INDEXref" denotes the temporal distance between the main reference field and the current field, "B" denotes the temporal distance between the auxiliary reference field and the main reference field, and "½INDEXref" denotes a value to round off the result value of Equation 6.

$$MV_{px} = \frac{MV_{rx} \cdot (INDEX_{ref} - B) + \frac{1}{2} INDEX_{ref}}{INDEX_{ref}} \quad (6)$$

$$MV_{py} = \frac{(MV_{ry} + \text{offset}) \cdot (INDEX_{ref} - B) + \frac{1}{2} INDEX_{ref}}{INDEX_{ref}}$$

When the polarity of the current field is different from the polarity of the main reference field and the auxiliary reference field is positioned temporally closer than the main reference field to the current field, the vertical component multiplication result in the multiplication result should be corrected. That is, when the polarity of the current field is different from the polarity of the main reference field and the auxiliary reference field is positioned temporally closer than the main reference field to the current field, the motion estimation unit 101 adds an offset to correct the polarity difference between the current field and the main reference field to the motion vector of the main reference field, and multiplies the addition result by the ratio of the difference between the temporal distance between the main reference field and the current field and the temporal distance between the auxiliary reference field and the main reference field to the temporal distance between the main reference field and the current field, thereby deriving the motion vector of the auxiliary reference field. Since the offset value in Equation 6 is the same as that in Equation 5, explanation on the offset value in Equation 6 will be omitted here.

Also, the motion estimation unit 101 compares the compression ratio of the current field according to the motion vector of the main reference field with the compression ratio of the current field according to the motion vector of the auxiliary reference field, and according to the comparison result, the motion estimation unit 101 selects any one of the motion vectors of the main reference field and the auxiliary reference field. The motion compensation unit 102 generates a prediction field of the current field from at least one reference field from among the reference fields stored in the buffer 111, by using the motion vector of the main reference field or the auxiliary reference field selected by the motion estimation unit 101. More specifically, the motion compensation unit 102 determines the values of blocks of at least one reference field indicated by the main reference field or the auxiliary reference field selected by the motion estimation unit 101 as the values of the blocks of the current field, thereby generating the prediction field of the current field.

The subtracter 103 generates a residue field between a current field and a prediction field, by subtracting the prediction field generated by the motion compensation unit 102 from the current field. The transform unit 104 transforms the residue field generated by the subtracter 103 from the color space to the frequency space, thereby generating frequency coefficients of this residue field.

The quantization unit 105 quantizes frequency coefficients generated by the transform unit 104. More specifically, the quantization unit 105 divides the frequency coefficients generated by the transform unit 104 by a quantization parameter, and approximates the results to integer values. The entropy encoding unit 106 entropy-encodes the integer values corresponding to the results quantized by the quantization unit 105 and encoding information of the current field, thereby generating a bitstream.

In this case, the encoding information of the current image is information generated in the image encoding process in the motion estimation unit 101 and other units and is necessary when the current image is desired to be restored in an image decoding apparatus. Examples of this information may include an index of a reference image and a motion vector. In particular, in an image decoding apparatus corresponding to the image encoding apparatus 100 according to the current embodiment, only the motion vector of a main reference image is transferred, and the motion vector of an auxiliary reference image is derived from the motion vector of the main reference image. Accordingly, in addition to the general information as described above, information to derive the motion vector of an auxiliary reference image is further required.

However, the image encoding apparatus 100 may directly transmit the index and motion vector of the auxiliary reference image to the image decoding apparatus without transmitting information to derive the motion vector of the auxiliary reference image. In this case, the process of deriving the motion vector of the auxiliary reference image in the image decoding apparatus is not necessary. In general, the amount of data to express the index and motion vector of an auxiliary reference image is big, and therefore it is more efficient for the image encoding apparatus 100 to transmit information to derive the motion vector of the auxiliary reference image to the image decoding apparatus.

The inverse quantization unit 108 inverse-quantizes the integer values corresponding to the results quantized by the quantization unit 105, thereby restoring the frequency coefficients of the residue field. More specifically, the inverse quantization unit 108 multiplies the integer values approximated by the quantization unit 105 by a quantization parameter, thereby restoring the frequency coefficients of the residue field between the current field and the prediction field. The inverse transform unit 109 transforms the frequency coefficients restored by the inverse quantization unit 108 from the frequency space to the color space, thereby restoring the residue field between the current field and the prediction field. The adder 110 adds the residue field restored by the inverse transform unit 109 to the prediction field generated by the motion compensation unit 102, thereby generating a restoration field of the current field and storing this restoration field in the buffer 111.

Figure 8:
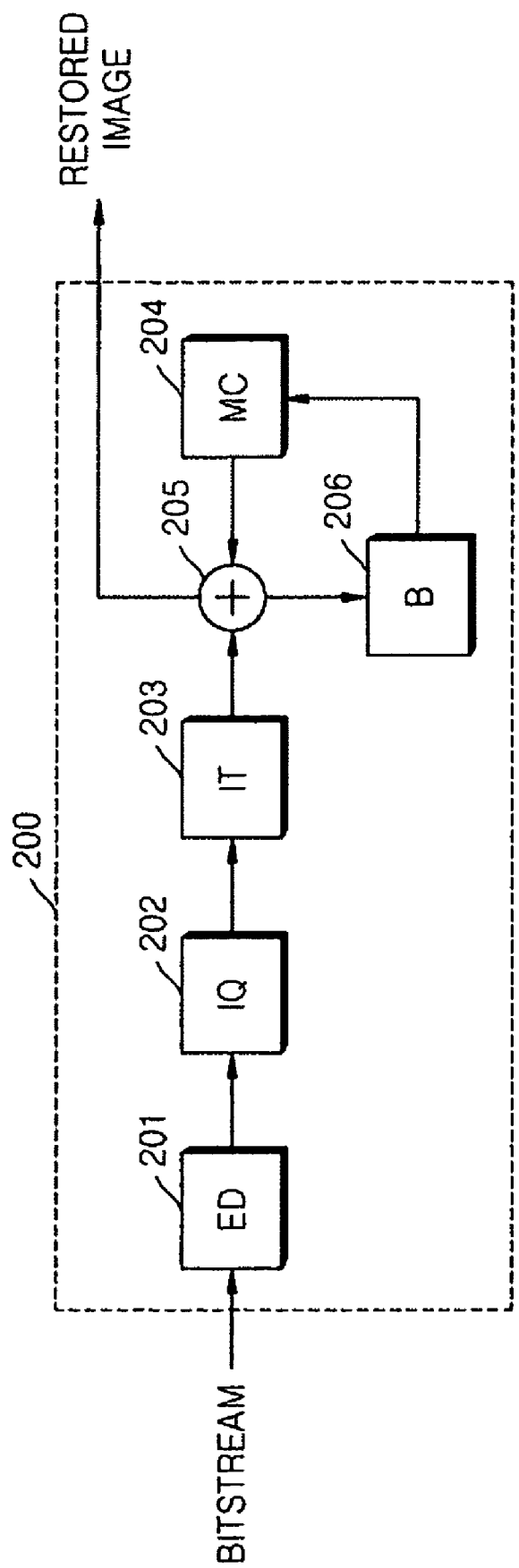
FIG. 8 is a diagram illustrating a structure of an image decoding apparatus according to an embodiment.

FIG. 8 is a diagram illustrating a structure of an image decoding apparatus 200 according to an embodiment. The image decoding apparatus 200 according to the current embodiment includes an entropy decoding unit 201, an inverse quantization unit 202, an inverse transform unit 203, a motion compensation unit 204, an adder 205, and a buffer 206. A process of restoring an image in the image decoding apparatus 200 illustrated in FIG. 8 is the same as the image restoration process in the image encoding apparatus 100 illustrated in FIG. 2. Accordingly, though omitted hereinafter, those explained above with reference to the image encoding apparatus 100 illustrated in FIG. 2 are applied to the image decoding apparatus 200 according to the current embodiment.

In particular, decoding an image in the apparatus 200 illustrated in FIG. 8 will be divided into a case where decoding is performed according to a progressive scanning method and a case where decoding is performed according an interlace scanning method and explained. First, the case where an image is decoded in the apparatus 200 according to the progressive scanning method will now be explained.

The entropy decoding unit 201 entropy-decodes a bitstream transmitted from the image encoding apparatus 100 illustrated in FIG. 2, thereby restoring integer values corresponding to the quantization result of the residue image between a current image and a prediction image, and encoding information of the current image. The inverse quantization unit 202 inverse-quantizes the integer values restored by the entropy decoding unit 201, thereby restoring frequency coefficients of the residue image between the current image and the prediction image. The inverse transform unit 203 transforms the frequency coefficients restored by the inverse quantization unit 202 from the frequency space to the color space, thereby restoring the residue image between the current image and the prediction image.

The motion compensation unit 204 selectively linearly transforms the motion vector of a main reference image included in the information restored by the entropy decoding unit 201 based on the position of an auxiliary reference image included in the restored information, thereby deriving the motion vector of the auxiliary reference image corresponding to the position. If no motion vector of any auxiliary reference image is selected in the motion estimation process in the image encoding apparatus 100, the value of the position of the auxiliary reference image does not exist in the syntax of the bitstream received from the image encoding apparatus 100. In this case, the motion compensation unit 204 does not derive the motion vector of the auxiliary reference image. More specifically, the motion compensation unit 204 selectively linearly transforms the motion vector of the main reference image by using the relationship between the temporal distance between the main reference image and the current image and the temporal distance between the auxiliary reference image corresponding to the position and the main reference image, thereby deriving the motion vector of the auxiliary reference image corresponding to the position. A more specific process of deriving a motion vector using Equations 1 and 2 is the same as described above, and therefore the explanation will be omitted here.

Also, by using the motion vector of the main reference image or the auxiliary reference image, the motion compensation unit 204 generates a prediction image of the current image from at least one reference image from among reference images stored in the buffer 206. More specifically, the motion compensation unit 204 determines the values of blocks of at least one reference image indicated by the motion vector of the main reference image included in the information restored in the entropy decoding unit 201, or by the motion vector of the auxiliary reference image derived from the motion vector of the main reference image as the values of blocks of the current image, thereby generating the prediction image of the current image. The adder 205 adds the residue image restored by the inverse transform unit 203 to the prediction image generated by the motion compensation unit 204, thereby generating a restoration image of the current image and storing the restoration image in the buffer 206.

Next, decoding an image in the image decoding apparatus 200 illustrated in FIG. 8 according to the interlace scanning method will now be explained.

The entropy decoding unit 201 entropy-decodes a bitstream transmitted from the image encoding apparatus 100 illustrated in FIG. 2, thereby restoring integer values corresponding to the quantization result of the residue field between a current field and a prediction field, and encoding information of the current field. The inverse quantization unit 202 inverse-quantizes the integer values restored by the entropy decoding unit 201, thereby restoring frequency coefficients of the residue field between the current field and the prediction field. The inverse transform unit 203 transforms the frequency coefficients restored by the inverse quantization unit 202 from the frequency space to the color space, thereby restoring the residue field between the current field and the prediction field.

The motion compensation unit 204 selectively linearly transforms the motion vector of a main reference field included in the information restored by the entropy decoding unit 201 based on the position of an auxiliary reference field included in the restored information, thereby deriving the motion vector of the auxiliary reference field corresponding to the position. More specifically, the motion compensation unit 204 selectively linearly transforms the motion vector of the main reference field by using the relationship between the temporal distance between the main reference field and the current field and the temporal distance between the auxiliary reference field corresponding to the position and the main reference field, and the polarity difference between the main reference field and the auxiliary reference field, thereby deriving the motion vector of the auxiliary reference field corresponding to the position. A more specific process of deriving a motion vector using Equations 3 and 4 is the same as described above, and therefore the explanation will be omitted here.

Also, by using the motion vector of the main reference field or the auxiliary reference field, the motion compensation unit 204 generates a prediction field of the current field from at least one reference field from among reference fields stored in the buffer 206. More specifically, the motion compensation unit 204 determines the values of blocks of at least one reference field indicated by the motion vector of the main reference field included in the information restored in the entropy decoding unit 201, or by the motion vector of the auxiliary reference field derived from the motion vector of the main reference field, as the values of blocks of the current field, thereby generating the prediction image of the current field. The adder 205 adds the residue field restored by the inverse transform unit 203 to the prediction field generated by the motion compensation unit 204, thereby generating a restoration field of the current field and storing the restoration field in the buffer 206.

Figure 9:
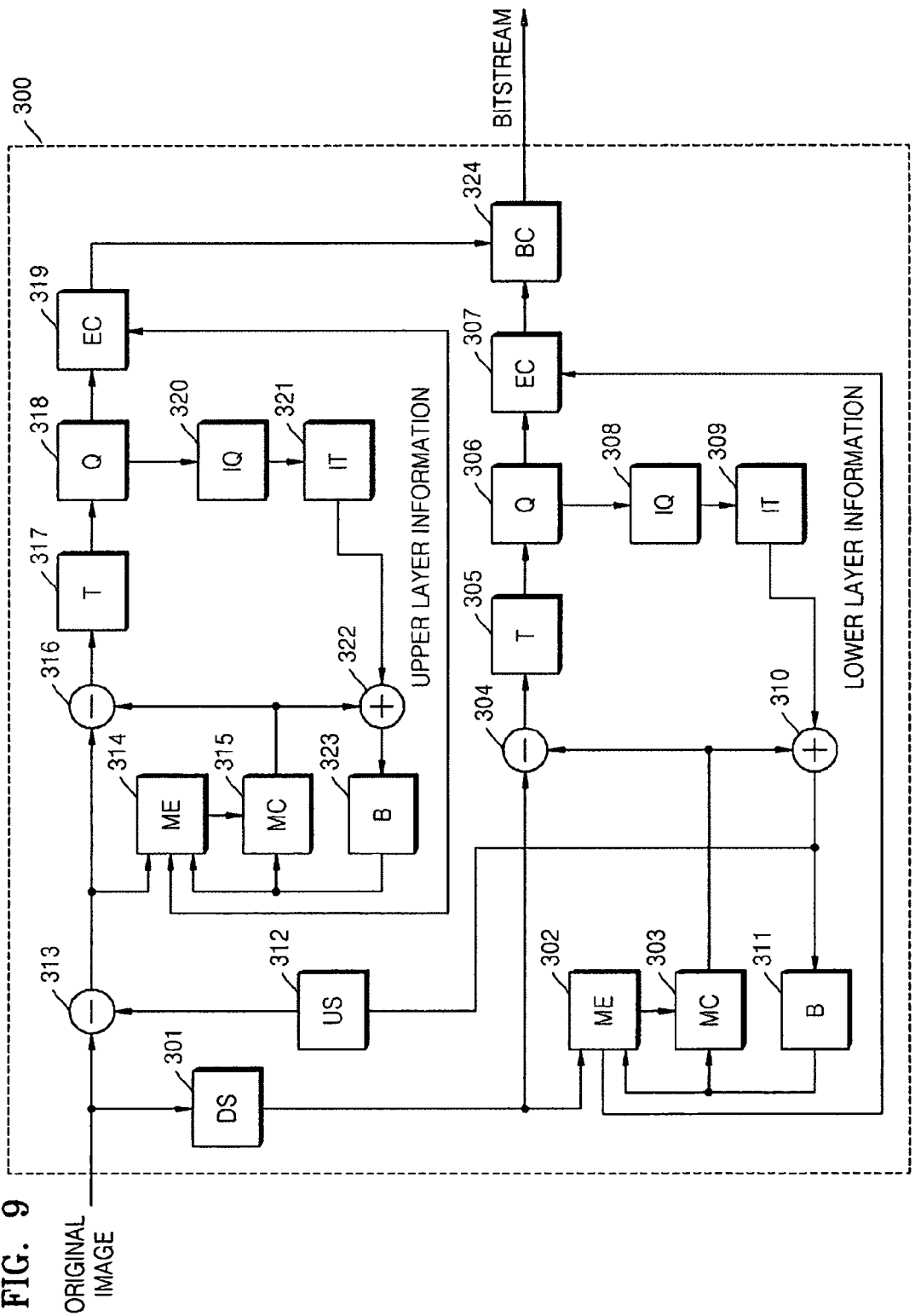
FIG. 9 is a diagram illustrating a structure of an image encoding apparatus according to an embodiment.

FIG. 9 is a diagram illustrating a structure of an image encoding apparatus according to another embodiment.

Referring to FIG. 9, the image encoding apparatus 300 according to the current embodiment is formed with a down-sampler 301, a first motion estimation unit 302, a first motion compensation unit 303, a first subtracter 304, a first transform unit 305, a first quantization unit 306, a first entropy encoding unit 307, a first inverse quantization unit 308, a first inverse transform unit 309, a first adder 310, a first buffer 311, an up-sampler 312, a second subtractor 313, a second motion estimation unit 314, a second motion compensation unit 315, a third subtracter 316, a second transform unit 317, a second quantization unit 318, a second entropy encoding unit 319, a second inverse quantization unit 320, a second inverse transform unit 321, a second adder 322, a second buffer 323, and a bitstream generation unit 324.

The image encoding apparatus 300 illustrated in FIG. 9 is the same as the image encoding apparatus 100 illustrated in FIG. 2, except that elements related to an image encoding process of an enhancement layer are added in the image encoding apparatus 300. Accordingly, though omitted hereinafter, the explanation of the image encoding apparatus 100 illustrated in FIG. 2 described above is also applied to the image encoding apparatus 300 according to the current embodiment. In particular, encoding an image in the image encoding apparatus 300 illustrated in FIG. 9 will be divided into a case where encoding is performed according to a progressive scanning method and a case where encoding is performed according to an interlace scanning method and explained. First, the case where encoding in the image encoding apparatus 300 is performed according to the progressive scanning method will now be explained.

The down-sampler 301 down-samples an original image currently input to the image encoding apparatus from among a series of original images corresponding to moving pictures, thereby generating a base image.

The first motion estimation unit 302 estimates the motion of the base image generated by the down-sampler 301 with reference to a main reference image from among reference images stored in the first buffer 311, thereby calculating the motion vector of the main reference image. Also, the first motion estimation unit 302 selects at least one reference image within a predetermined temporal distance from the main reference image from among reference images stored in the buffer 311, as an auxiliary reference image, and linearly transforms the motion vector of the main reference image calculated as described above, thereby deriving a motion vector of the auxiliary reference image. More specifically, by using the relationship between the temporal distance between the main reference image and the base image and the temporal distance between the auxiliary reference image and the main reference image, the first motion estimation unit 302 derives the motion vector of the auxiliary reference image from the motion vector of the main reference image. A specific process of deriving a motion vector using Equations 1 and 2 is the same as described above, and therefore the explanation will be omitted here.

Also, the first motion estimation unit 302 compares a compression ratio of the base image according to the motion vector of the main reference image with a compression ratio of the base image according to the motion vector of the auxiliary reference image, and according to the comparison result, the first motion estimation unit 302 selects any one of the motion vectors of the main reference image and the auxiliary reference image. The first motion compensation unit 303 generates a prediction image of the base image from at least one reference image from among the reference images stored in the buffer 311, by using the motion vector of the main reference image or the motion vector of the auxiliary reference image selected by the first motion estimation unit 302.

The first subtracter 304 generates the residue image (hereinafter simply referred to as a "first residue image") between a base image and a prediction image, by subtracting the prediction image generated by the first motion compensation unit 303 from the base image. The first transform unit 305 transforms the first residue image generated by the first subtracter 304 from the color space to the frequency space, thereby generating frequency coefficients of the first residue image. The first quantization unit 306 quantizes frequency coefficients generated by the first transform unit 305. The first entropy encoding unit 307 entropy-encodes integer values corresponding to the results quantized by the first quantization unit 306 and encoding information of the base image, thereby generating a base layer bitstream.

The first inverse quantization unit 308 inverse-quantizes the integer values corresponding to the results quantized by the first quantization unit 306, thereby restoring the frequency coefficients of the first residue image. The first inverse transform unit 309 transforms the frequency coefficients restored by the first inverse quantization unit 308 from the frequency space to the color space, thereby restoring the first residue image. The first adder 310 adds the first residue image restored by the first inverse transform unit 309 to the prediction image generated by the first motion compensation unit 303, thereby generating a restoration image of the base image and storing this restoration image in the first buffer 311.

A process of encoding an image in an enhancement layer which will be explained hereinafter is the same as the image encoding process in the base layer already described above, except the difference between an image used in the base layer and an image used in the enhancement layer. Accordingly, though omitted hereinafter, the explanation described above is also applied to the image encoding process in the enhancement layer.

The up-sampler 312 up-samples a restoration image generated by the first adder 310. The second subtracter 313 subtracts the restoration image up-sampled by the up-sampler 312 from an original image currently input to the image encoding apparatus 300, thereby generating the residue image (hereinafter simply referred to as a "second residue image") between the original image and the restoration image up-sampled by the up-sampler 312.

The second motion estimation unit 314 estimates the motion of the second residue image generated by the second subtracter 313 with reference to the main reference image from among the reference images stored in the second buffer 323, thereby calculating a motion vector of the main reference image. Also, the second motion estimation unit 314 selects at least one reference image within a predetermined temporal distance from the main reference image from among the reference images stored in the second buffer 323 as an auxiliary reference image, and linearly transforms the motion vector of the main reference image calculated as described above, thereby deriving a motion vector of the auxiliary reference image. More specifically, by using the relationship between the temporal distance between the main reference image and the second residue image and the temporal distance between the auxiliary reference image and the main reference image, the second motion estimation unit 314 derives the motion vector of the auxiliary reference image from the motion vector of the main reference image.

Also, the second motion estimation unit 314 compares the compression ratio of the base image according to the motion vector of the main reference image with a compression ratio of the second residue image according to the motion vector of the auxiliary reference image, and according to the comparison result, the second motion estimation unit 314 selects any one of the motion vectors of the main reference image and the auxiliary reference image. The second motion compensation unit 314 generates a prediction image of the second residue image from at least one reference image from among the reference images stored in the second buffer 323 by using the motion vector of the main reference image or the auxiliary reference image selected by the second motion estimation unit 314.

The third subtracter 316 generates the residue image (hereinafter simply referred to as a "third residue image") between the second residue image and the prediction image by subtracting the prediction image generated by the second motion compensation unit 315 from the second residue image generated by the second subtracter 313. The second transform unit 317 transforms the third residue image generated by the third subtracter 316 from the color space to the frequency space, thereby generating frequency coefficients of the third residue image. The quantization unit 318 quantizes frequency coefficients generated by the second transform unit 317 by using a quantization parameter. The entropy encoding unit 319 entropy-encodes integer values corresponding to the results quantized by the quantization unit 318 and image information, thereby generating an enhancement layer bitstream.

The second inverse quantization unit 320 inverse-quantizes the integer values corresponding to the results quantized by the quantization unit 318, thereby restoring the frequency coefficients of the third residue image. The second inverse transform unit 321 transforms the frequency coefficients restored by the second inverse quantization unit 320 from the frequency space to the color space, thereby restoring the third residue image. The second adder 322 adds the third residue image restored by the second inverse transform unit 321 to the prediction image generated by the second motion compensation unit 315, thereby generating a restoration image of the second residue image and storing this restoration image in the second buffer 323.

The bitstream generation unit 324 combines the base layer bitstream generated by the first entropy encoding unit 307 and the enhancement layer bitstreams generated by the second entropy encoding unit 319, thereby generating a scalable bitstream.

Next, the case where an image is encoded in the image encoding apparatus 300 illustrated in FIG. 9 according to the interlace scanning method will now be explained.

The down-sampler 301 down-samples an image (hereinafter referred to as an "original field") corresponding to half of an original image currently input to the image encoding apparatus from among a series of original images corresponding to moving pictures, thereby generating a base field.

The first motion estimation unit 302 estimates the motion of the base field generated by the down-sampler 301 with reference to a main reference field from among reference fields stored in the first buffer 311, thereby calculating the motion vector of the main reference field. Also, the first motion estimation unit 302 selects at least one reference field within a predetermined temporal distance from the main reference field from among reference fields stored in the buffer 311 as an auxiliary reference field, and linearly transforms the motion vector of the main reference field calculated as described above, thereby deriving a motion vector of the auxiliary reference field. More specifically, by using the relationship between the temporal distance between the main reference field and the base field and the temporal distance between the auxiliary reference field and the main reference field, and the polarity difference between the main reference field and the auxiliary reference field, the first motion estimation unit 302 linearly transforms the motion vector of the main reference field, thereby deriving the motion vector of the auxiliary reference field. A specific process of deriving a motion vector using Equations 3 and 4 is the same as described above, and therefore the explanation will be omitted here.

Also, the first motion estimation unit 302 compares the compression ratio of the base field according to the motion vector of the main reference field with the compression ratio of the base field according to the motion vector of the auxiliary reference field, and according to the comparison result, the first motion estimation unit 302 selects any one of the motion vectors of the main reference field and the auxiliary reference field. The first motion compensation unit 303 generates a prediction field of the base field from at least one reference field from among the reference fields stored in the buffer 311 by using the motion vector of the main reference field or the auxiliary reference field selected by the first motion estimation unit 302.

The first subtracter 304 generates the residue field (hereinafter simply referred to as a "first residue field") between a base field and a prediction field by subtracting the prediction field generated by the first motion compensation unit 303 from the base field. The first transform unit 305 transforms the first residue field generated by the first subtracter 304 from the color space to the frequency space, thereby generating frequency coefficients of the first residue field. The first quantization unit 306 quantizes frequency coefficients generated by the first transform unit 305. The first entropy encoding unit 307 entropy-encodes integer values corresponding to the results quantized by the first quantization unit 306 and encoding information of the base field, thereby generating a base layer bitstream.

The first inverse quantization unit 308 inverse-quantizes the integer values corresponding to the results quantized by the first quantization unit 306, thereby restoring the frequency coefficients of the first residue field. The first inverse transform unit 309 transforms the frequency coefficients restored by the first inverse quantization unit 308 from the frequency space to the color space, thereby restoring the first residue field. The first adder 310 adds the first residue field restored by the first inverse transform unit 309 to the prediction field generated by the first motion compensation unit 303, thereby generating a restoration field of the base field and storing this restoration field in the first buffer 311.

The up-sampler 312 up-samples a restoration field generated by the first adder 310. The second subtracter 313 subtracts the restoration field up-sampled by the up-sampler 312 from an original field currently input to the image encoding apparatus 300, thereby generating the residue field (hereinafter simply referred to as a "second residue field") between the original field and the restoration field up-sampled by the up-sampler 312.

The second motion estimation unit 314 estimates the motion of the second residue field generated by the second subtracter 313 with reference to the main reference field from among the reference fields stored in the second buffer 323, thereby calculating a motion vector of the main reference field. Also, the second motion estimation unit 314 selects at least one reference field within a predetermined temporal distance from the main reference field from among the reference fields stored in the second buffer 323 as an auxiliary reference field, and linearly transforms the motion vector of the main reference field calculated as described above, thereby deriving a motion vector of the auxiliary reference field. More specifically, by using the relationship between the temporal distance between the main reference field and the second residue field and the temporal distance between the auxiliary reference field and the main reference field, and the polarity difference between the main reference field and the auxiliary reference field, the second motion estimation unit 314 derives the motion vector of the auxiliary reference field from the motion vector of the main reference field.

Also, the second motion estimation unit 314 compares the compression ratio of the base field according to the motion vector of the main reference field with the compression ratio of the second residue field according to the motion vector of the auxiliary reference field, and according to the comparison result, the second motion estimation unit 314 selects any one of the motion vectors of the main reference field and the auxiliary reference field. The second motion compensation unit 314 generates a prediction field of the second residue field from at least one reference field from among the reference fields stored in the second buffer 323 by using the motion vector of the main reference field or the auxiliary reference field selected by the second motion estimation unit 314.

The third subtracter 316 generates the residue field (hereinafter simply referred to as a "third residue field") between the second residue field and the prediction field by subtracting the prediction field generated by the second motion compensation unit 315 from the second residue field generated by the second subtracter 313. The second transform unit 317 transforms the third residue field generated by the third subtracter 316 from the color space to the frequency space, thereby generating frequency coefficients of the third residue field. The quantization unit 318 quantizes frequency coefficients generated by the second transform unit 317 by using a quantization parameter. The entropy encoding unit 319 entropy-encodes integer values corresponding to the results quantized by the quantization unit 318 and encoding information of the second residue field, thereby generating an enhancement layer bitstream.

The second inverse quantization unit 320 inverse-quantizes the integer values corresponding to the results quantized by the quantization unit 318, thereby restoring the frequency coefficients of the third residue field. The second inverse transform unit 321 transforms the frequency coefficients restored by the second inverse quantization unit 320 from the frequency space to the color space, thereby restoring the third residue field. The second adder 322 adds the third residue field restored by the second inverse transform unit 321 to the prediction field generated by the second motion compensation unit 315, thereby generating a restoration field of the second residue field and storing this restoration field in the second buffer 323.

The bitstream generation unit 324 combines the base layer bitstream generated by the first entropy encoding unit 307 and the enhancement layer bitstreams generated by the second entropy encoding unit 319, thereby generating a scalable bitstream.

Figure 10:
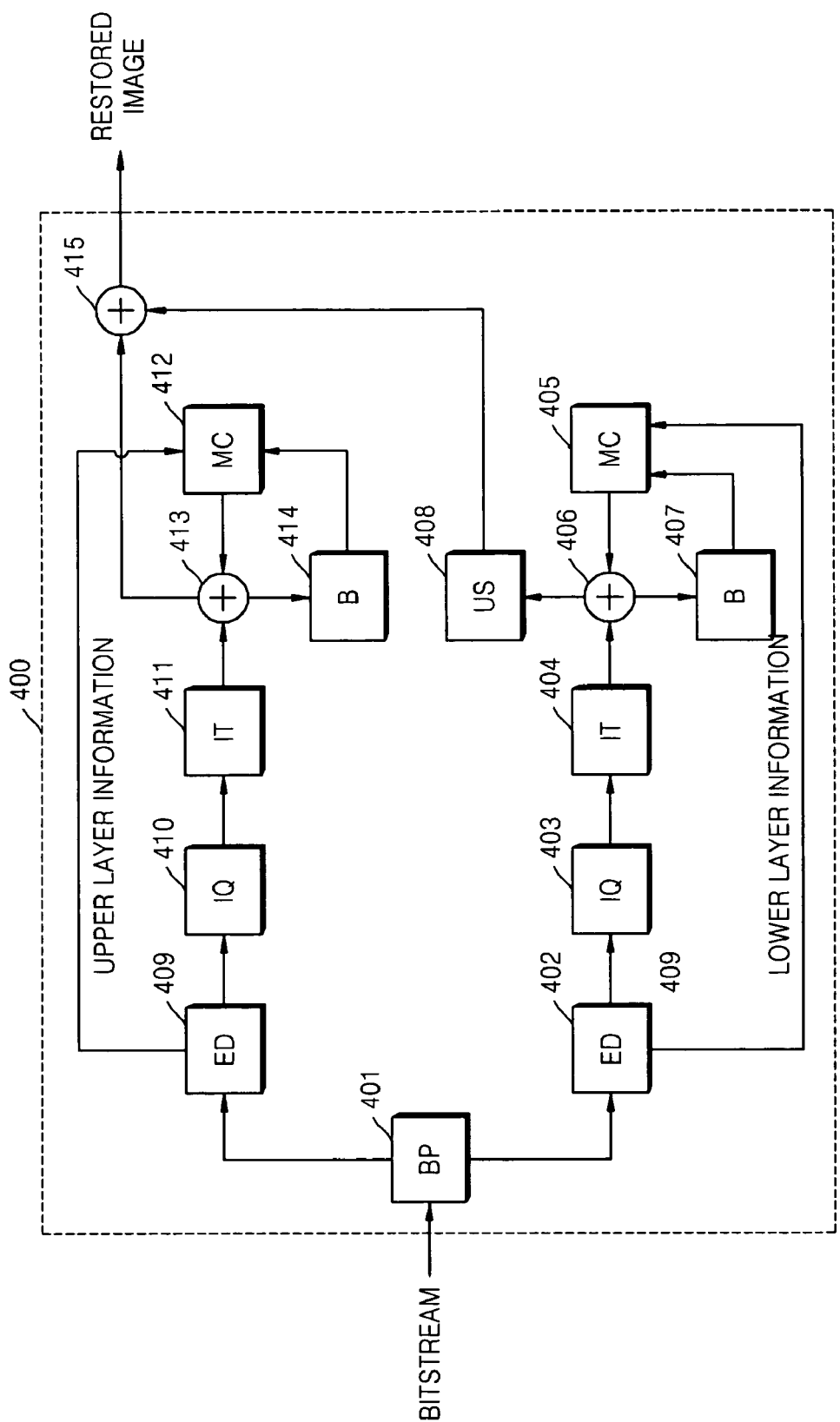
FIG. 10 is a diagram illustrating a structure of an image decoding apparatus according to another embodiment.

FIG. 10 is a diagram illustrating a structure of an image decoding apparatus according to another embodiment.

Referring to FIG. 10, the image decoding apparatus 400 according to the current embodiment is formed with a bitstream parser 401, a first entropy decoding unit 402, a first inverse quantization unit 403, a first inverse transform unit 404, a first motion compensation unit 405, a first adder 406, a first buffer 407, an up-sampler 408, a second entropy decoding unit 409, a second inverse quantization unit 410, a second inverse transform unit 411, a second motion compensation unit 412, a second adder 413, a second buffer 414, and a third adder 415.

The image decoding apparatus 400 illustrated in FIG. 10 is the same as the image decoding apparatus illustrated in FIG.

8 except that elements related to inter decoding of an enhancement layer are added in the image decoding apparatus 400. Accordingly, though omitted hereinafter, those explained above with reference to the image decoding apparatus 200 illustrated in FIG. 8 are also applied to the image decoding apparatus 400 according to the current embodiment. In particular, decoding an image in the apparatus 400 illustrated in FIG. 10 will be divided into a case where decoding is performed according to a progressive scanning method and a case where decoding is performed according an interlace scanning method and explained. First, the case where an image is decoded in the apparatus 400 illustrated in FIG. 10 according to the progressive scanning method will now be explained.

The bitstream parser 401 parses a scalable bitstream transmitted from the image encoding apparatus 300 illustrated in FIG. 9, thereby extracting a base layer bitstream and an enhancement layer bitstream from this scalable bitstream. The first entropy decoding unit 402 entropy-decodes the base layer bitstream extracted by the bitstream parser 401, thereby restoring integer values corresponding to the quantization result of the residue image (hereinafter simply referred to as a "first residue image") between a base image and a prediction image, and information to decode the current image. The first inverse quantization unit 403 inverse-quantizes the integer values restored by the first entropy decoding unit 402, thereby restoring frequency coefficients of the first residue image. The first inverse transform unit 404 transforms the frequency coefficients restored by the first inverse quantization unit 403 from the frequency space to the color space, thereby restoring the first residue image.

The first motion compensation unit 405 selectively linearly transforms the motion vector of a main reference image included in the information restored by the first entropy decoding unit 402 based on the position of an auxiliary reference image included in the restored information, thereby deriving the motion vector of the auxiliary reference image corresponding to the position. More specifically, the first motion compensation unit 405 selectively linearly transforms the motion vector of the main reference image by using the relationship between the temporal distance between the main reference image and the base image and the temporal distance between the auxiliary reference image corresponding to the position and the main reference image, thereby deriving the motion vector of the auxiliary reference image corresponding to the position. A more specific process of deriving a motion vector using Equations 1 and 2 is the same as described above, and therefore the explanation will be omitted here.

Also, by using the motion vector of the main reference image or the auxiliary reference image, the first motion compensation unit 405 generates a prediction image of the base image from at least one reference image from among reference images stored in the first buffer 407. The first adder 406 adds the first residue image restored by the first inverse transform unit 404 to the prediction image generated by the first motion compensation unit 405, thereby generating a restoration image of the base image and storing the restoration image in the first buffer 407.

A process of decoding an image in an enhancement layer which will be explained below is the same as the process of decoding an image in the base layer already described above except the difference between an image used in the base layer and an image used in the enhancement layer Accordingly, though omitted hereinafter, the explanation described above is also applied to the image decoding process in the enhancement layer.

The up-sampler 408 up-samples a restoration image generated by the adder 406. The second entropy-decoding unit 409 entropy-decodes the enhancement layer bitstream extracted by the bitstream parser 401, thereby restoring the integer values corresponding to the quantization result of the residue image (hereinafter simply referred to as a "third residue image") between the residue image (hereinafter simply referred to as a "second residue image"), which is between the original image and the restoration image up-sampled by the up-sampler 408, and the prediction image, and encoding information of the third residue image. The second inverse quantization unit 410 inverse-quantizes the integer values restored by the second entropy-decoding unit 409 by using a quantization parameter, thereby restoring frequency coefficients of the third residue image.

The second inverse transform unit 411 transforms the frequency coefficients restored by the second inverse quantization unit 410 from the frequency space to the color space, thereby restoring the third residue image. The second motion compensation unit 412 selectively linearly transforms the motion vector of the main reference image included in the information restored by the second entropy decoding unit 409 based on the position of an auxiliary reference image included in the restored information, thereby deriving the motion vector of the auxiliary reference image corresponding to this position. More specifically, the second motion compensation unit 412 linearly transforms the motion vector of the main reference image by using the relationship between the temporal distance between the main reference image and the second residue image and the temporal distance between the auxiliary reference image corresponding to the position and the main reference image, thereby deriving the motion vector of the auxiliary reference image corresponding to the position. A more specific process of deriving a motion vector using Equations 1 and 2 is the same as described above, and therefore the explanation will be omitted here.

Also, by using the motion vector of the main reference image or the auxiliary reference image, the second motion compensation unit 412 generates a prediction image of the second residue image from at least one reference image from among reference images stored in the second buffer 414. The second adder 413 adds the third residue image restored by the second inverse transform unit 411 to the prediction image generated by the second motion compensation unit 412, thereby generating a restoration image of the second residue image and storing the restoration image in the second buffer 414. The third adder 415 adds the restoration image generated by the second adder 413 to the restoration image up-sampled by the up-sampler 408, thereby generating a restoration image of the original image.

Next, decoding an image in the image decoding apparatus 400 illustrated in FIG. 10 according to the interlace scanning method will now be explained.

The bitstream parser 401 parses a scalable bitstream transmitted from the image encoding apparatus 300 illustrated in FIG. 9, thereby extracting a base layer bitstream and an enhancement layer bitstream from this scalable bitstream. The first entropy decoding unit 402 entropy-decodes the base layer bitstream extracted by the bitstream parser 401, thereby restoring integer values corresponding to the quantization result of the residue field (hereinafter simply referred to as a "first residue field") between a base field and a prediction field, and encoding information of the base field. The first inverse quantization unit 403 inverse-quantizes the integer values restored by the first entropy decoding unit 402, thereby restoring frequency coefficients of the first residue field. The first inverse transform unit 404 transforms the frequency coefficients restored by the first inverse quantization unit 403 from the frequency space to the color space, thereby restoring the first residue field.

The first motion compensation unit 405 selectively linearly transforms the motion vector of a main reference field included in the information restored by the first entropy decoding unit 402 based on the position of an auxiliary reference field included in the restored information, thereby deriving the motion vector of the auxiliary reference field corresponding to the position. More specifically, the first motion compensation unit 405 selectively linearly transforms the motion vector of the main reference field by using the relationship between the temporal distance between the main reference field and the base field and the temporal distance between the auxiliary reference field corresponding to the position and the main reference field, and the polarity difference between the main reference field and the auxiliary reference field, thereby deriving the motion vector of the auxiliary reference field corresponding to the position. A more specific process of deriving a motion vector using Equations 3 and 4 is the same as described above, and therefore the explanation will be omitted here.

Also, by using the motion vector of the main reference field or the auxiliary reference field, the first motion compensation unit 405 generates a prediction field of the base field from at least one reference field from among reference fields stored in the first buffer 407. The first adder 406 adds the first residue field restored by the first inverse transform unit 404 to the prediction field generated by the first motion compensation unit 405, thereby generating a restoration field of the base field and storing the restoration field in the first buffer 407.

A process of decoding an image in an enhancement layer which will be explained below is the same as the process of decoding a field in the base layer already described above except the difference between a field used in the base layer and a field used in the enhancement layer. Accordingly, though omitted hereinafter, the explanation described above is also applied to the field decoding process in the enhancement layer.

The up-sampler 408 up-samples a restoration field generated by the adder 406. The second entropy-decoding unit 409 entropy-decodes the enhancement layer bitstream extracted by the bitstream parser 401, thereby restoring the integer values corresponding to the quantization result of the residue field (hereinafter simply referred to as a "third residue field") between the residue field (hereinafter simply referred to as a "second residue field"), which is between the original field and the restoration field up-sampled by the up-sampler 408, and the prediction field, and encoding information of the third residue field. The second inverse quantization unit 410 inverse-quantizes the integer values restored by the second entropy-decoding unit 409 by using a quantization parameter, thereby restoring frequency coefficients of the third residue field.

The second inverse transform unit 411 transforms the frequency coefficients restored by the second inverse quantization unit 410 from the frequency space to the color space, thereby restoring the third residue field. The second motion compensation unit 412 selectively linearly transforms the motion vector of the main reference field included in the information restored by the second entropy decoding unit 409 based on the position of an auxiliary reference field included in the restored information, thereby deriving the motion vector of the auxiliary reference field corresponding to this position. More specifically, the second motion compensation unit 412 linearly transforms the motion vector of the main reference field by using the relationship between the temporal distance between the main reference field and the second residue field and the temporal distance between the auxiliary reference field corresponding to the position and the main reference field, thereby deriving the motion vector of the auxiliary reference field corresponding to the position. A more specific process of deriving a motion vector using Equations 3 and 4 is the same as described above, and therefore the explanation will be omitted here.

Also, by using the motion vector of the main reference field or the auxiliary reference field, the second motion compensation unit 412 generates a prediction field of the second residue field from at least one reference field from among reference fields stored in the second buffer 414. The second adder 413 adds the third residue field restored by the second inverse transform unit 411 to the prediction field generated by the second motion compensation unit 412, thereby generating a restoration field of the second residue field and storing the restoration field in the second buffer 414. The third adder 415 adds the restoration field generated by the second adder 413 to the restoration field up-sampled by the up-sampler 408, thereby generating a restoration field of the original field.

In order to avoid making a long-winded explanation of embodiments, the case where only one enhancement layer exists is explained above, but those skilled in the art of the current embodiment can understand that the embodiment described above can also be identically applied to a case where a plurality of enhancement layers exist.

Figure 11:
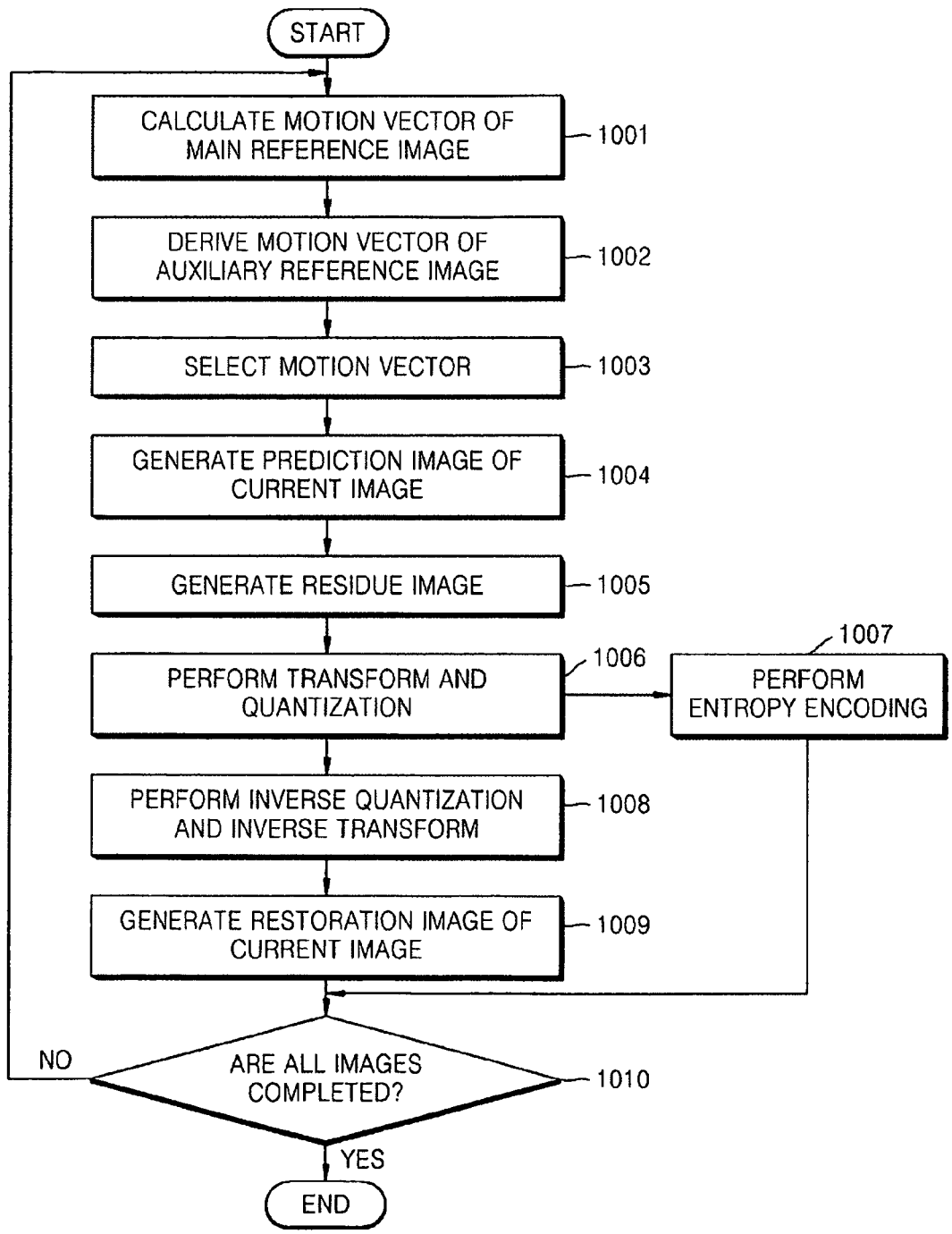
FIG. 11 is a flowchart illustrating operations of an image encoding method according to an embodiment.

FIG. 11 is a flowchart illustrating operations of an image encoding method according to an embodiment.

Referring to FIG. 11, the image encoding method according to the current embodiment is formed with operations processed in a time series in the image encoding apparatus 100 illustrated in FIG. 2. Accordingly, though omitted hereinafter, those explained above with reference to the image encoding apparatus 100 illustrated in FIG. 2 are also applied to the image encoding method according to the current embodiment. In particular, the image encoding method illustrated in FIG. 11 is for a case where an image is encoded according to a progressive scanning method.

In operation 1001, the image encoding apparatus 100 estimates the motion of a current image with reference to a main reference image from among reference images stored in the buffer 111, thereby calculating a motion vector of the main reference image. In operation 1002, the image encoding apparatus 100 derives a motion vector of an auxiliary reference image from the motion vector of the main reference image calculated in operation 1001. In operation 1003, the image encoding apparatus 100 compares the compression ratio of the current image according to the motion vector of the main reference image with the compression ratio of the current image according to the motion vector of the auxiliary reference image, and according to the comparison result, the image encoding apparatus 100 selects any one of the motion vectors of the main reference image and the auxiliary reference image.

In operation 1004, the image encoding apparatus 100 generates a prediction image of the current image from at least one reference image from among the reference images stored in the buffer 111 by using the motion vector of the main reference image or the motion vector of the auxiliary reference image selected in operation 1003. In operation 1005, the image encoding apparatus 100 subtracts the prediction image generated in operation 1004 from the current image, thereby generating the residue image between the current image and the prediction image.

In operation 1006, the image encoding apparatus 100 transforms the residue image generated in operation 1005 from the color space to the frequency space, thereby generating frequency coefficients of this residue image and quantizing the frequency coefficients. In operation 1007, the image encoding apparatus 100 entropy-encodes integer values corresponding to the result quantized in operation 1006 and encoding information of the current image, thereby generating a bitstream, and the process progresses to operation 1010.

In operation 1008, the image encoding apparatus 100 inverse-quantizes the integer values corresponding to the result quantized in operation 1006, thereby restoring frequency coefficients of the residue image between the current image and the prediction image, and by transforming the frequency coefficients from the frequency space to the color space, the image encoding apparatus 100 restores the residue image between the current image and the prediction image. In operation 1009, the image encoding apparatus 100 adds the residue image restored in operation 1008 to the prediction image generated in operation 1004, thereby generating a restoration image of the current image and storing this restoration image in the buffer 111.

In operation 1010, if operations 1001 through 1009 described above are performed for all of a series of images corresponding to a set of moving pictures, the image encoding apparatus 100 finishes the operation, or else operation 1001 is performed again.

Figure 12:
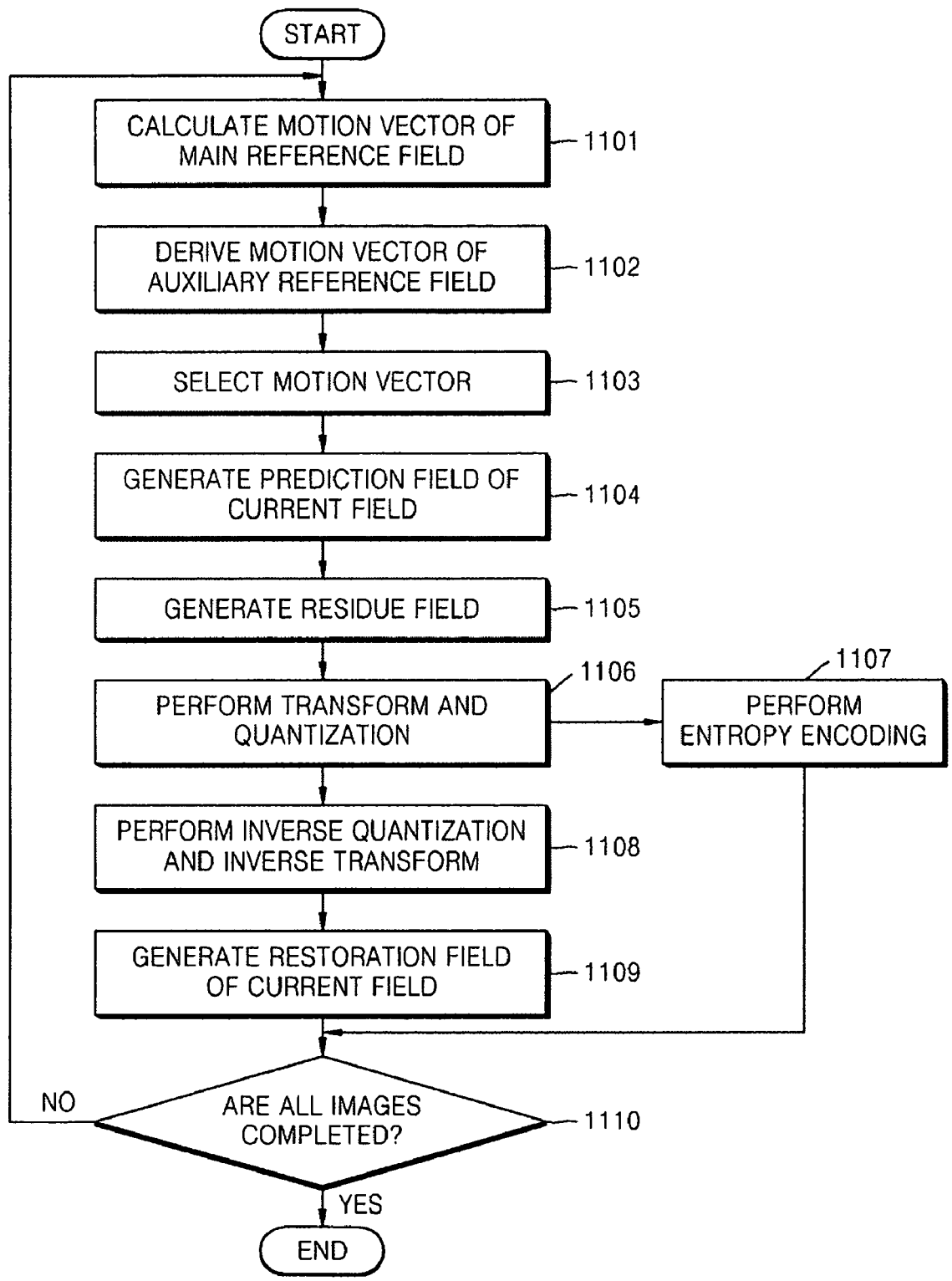
FIG. 12 is a flowchart illustrating operations of an image encoding method according to another embodiment.

FIG. 12 is a flowchart illustrating operations of an image encoding method according to another embodiment.

Referring to FIG. 11, the image encoding method according to the current embodiment is formed with operations processed in a time series in the image encoding apparatus 100 illustrated in FIG. 2. Accordingly, though omitted hereinafter, those explained above with reference to the image encoding apparatus 100 illustrated in FIG. 2 are also applied to the image encoding method according to the current embodiment. In particular, the image encoding method illustrated in FIG. 12 is for a case where an image is encoded according to an interlace scanning method.

In operation 1101, the image encoding apparatus 100 estimates the motion of a current field corresponding to half of an image currently input from among a series of images corresponding to a set of moving pictures with reference to a main reference field from among reference fields stored in the buffer 111, thereby calculating a motion vector of the main reference field. In operation 1102, the image encoding apparatus 100 derives a motion vector of an auxiliary reference field from the motion vector of the main reference field calculated in operation 1101. In operation 1103, the image encoding apparatus 100 compares the compression ratio of the current field according to the motion vector of the main reference field with the compression ratio of the current field according to the motion vector of the auxiliary reference field, and according to the comparison result, the image encoding apparatus 100 selects any one of the motion vectors of the main reference field and the auxiliary reference field.

In operation 1104, the image encoding apparatus 100 generates a prediction field of the current field from at least one reference field from among the reference fields stored in the buffer 111 by using the motion vector of the main reference field or the motion vector of the auxiliary reference field selected in operation 1103. In operation 1105, the image encoding apparatus 100 subtracts the prediction field generated in operation 1104 from the current field, thereby generating the residue field between the current field and the prediction field.

In operation 1106, the image encoding apparatus 100 transforms the residue field generated in operation 1105 from the color space to the frequency space, thereby generating frequency coefficients of this residue field and quantizing the frequency coefficients. In operation 1107, the image encoding apparatus 100 entropy-encodes integer values corresponding to the result quantized in operation 1106 and encoding information of the current field, thereby generating a bitstream. Thereafter, the process progresses to operation 1110.

In operation 1108, the image encoding apparatus 100 inverse-quantizes the integer values corresponding to the result quantized in operation 1006, thereby restoring frequency coefficients of the residue field between the current field and the prediction field, and by transforming the frequency coefficients from the frequency space to the color space, the image encoding apparatus 100 restores the residue field between the current field and the prediction field. In operation 1109, the image encoding apparatus 100 adds the residue field restored in operation 1108 to the prediction field generated in operation 1104, thereby generating a restoration field of the current field and storing this restoration field in the buffer 111.

In operation 1110, if operations 1101 through 1109 described above are performed for all of a series of images corresponding to a set of moving pictures, the image encoding apparatus 100 finishes the operation, or else operation 1101 is performed again.

Figure 13:
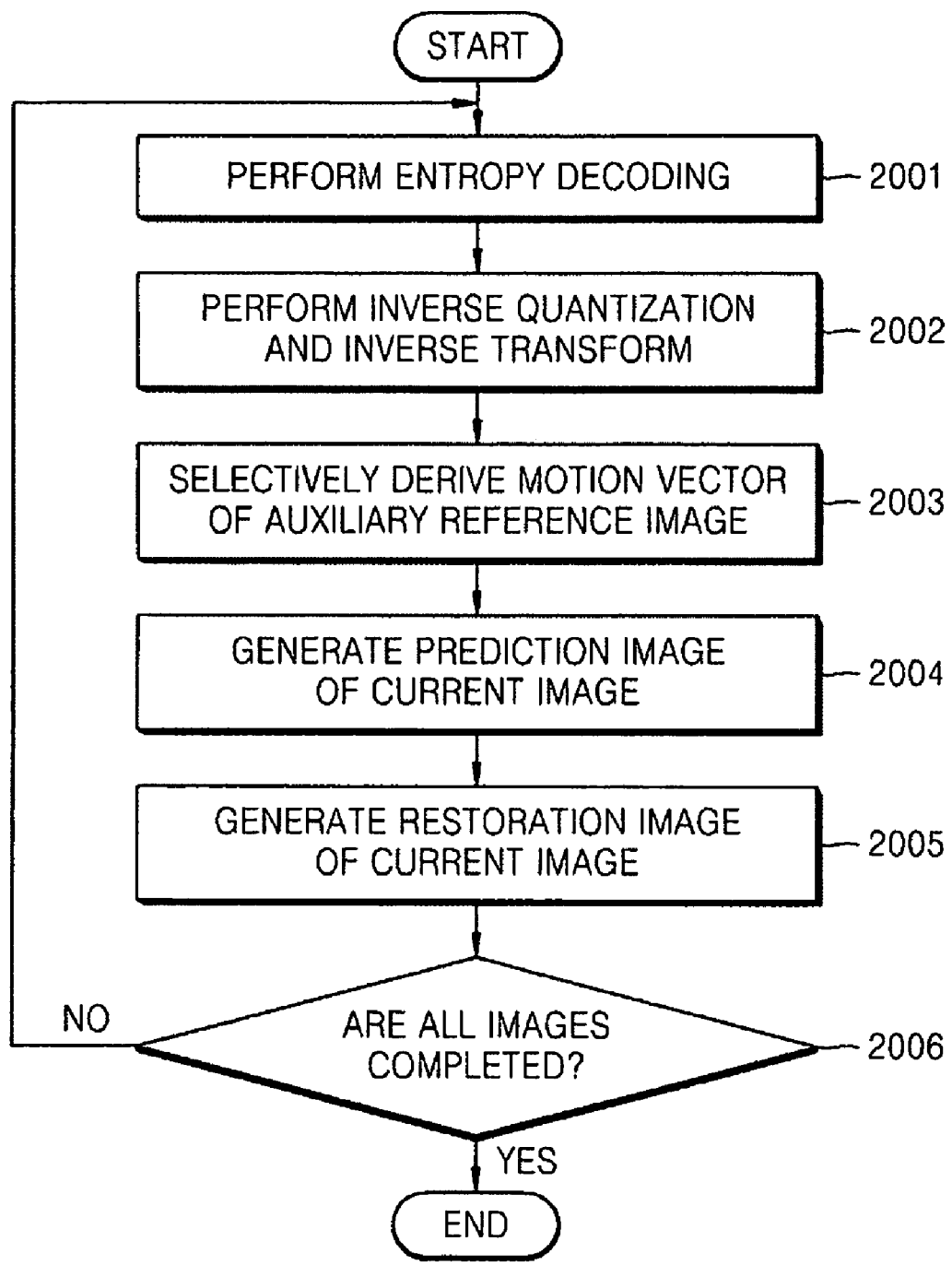
FIG. 13 is a flowchart illustrating operations of an image decoding method according to an embodiment.

FIG. 13 is a flowchart illustrating operations of an image decoding method according to an embodiment.

Referring to FIG. 13, the image decoding method according to the current embodiment is formed with operations processed in a time series in the image decoding apparatus 200 illustrated in FIG. 8. Accordingly, though omitted hereinafter, those explained above with reference to the image decoding apparatus 200 illustrated in FIG. 8 are also applied to the image decoding method according to the current embodiment. In particular, the image decoding method illustrated in FIG. 13 is for a case where an image is decoded according to a progressive scanning method.

In operation 2001, the image decoding apparatus 200 entropy-decodes a bitstream transmitted from the image encoding apparatus illustrated in FIG. 2, thereby restoring integer values corresponding to the quantization result of the residue image between a current image and a prediction image and encoding information of the current image. In operation 2002, the image decoding apparatus 200 inverse-quantizes the integer values restored in operation 2001, thereby restoring frequency coefficients of the residue image between the current image and the prediction image, and by transforming the frequency coefficients from the frequency space to the color space, the image decoding apparatus 200 restores the residue image between the current image and the prediction image.

In operation 2003, based on the position of an auxiliary reference image included in the information restored in operation 2001, the image decoding apparatus 200 selectively derives a motion vector of the auxiliary reference image corresponding to the position from the motion vector of the main reference image included in this information. In operation 2004, the image decoding apparatus 200 generates a prediction image of the current image from at least one reference image from among reference images stored in the buffer 206 by using the motion vector of the main reference image or the motion vector of the auxiliary reference image. In operation 2005, the image decoding apparatus 200 adds the residue image restored in operation 2002 to the prediction image generated in operation 2004, thereby generating a restoration image of the current image and storing this restoration image in the buffer 206.

In operation 2006, if operations 2001 through 2005 described above are performed for all of a series of images corresponding to a set of moving pictures, the image decoding apparatus 200 finishes the operation, or else operation 2001 is performed again.

Figure 14:
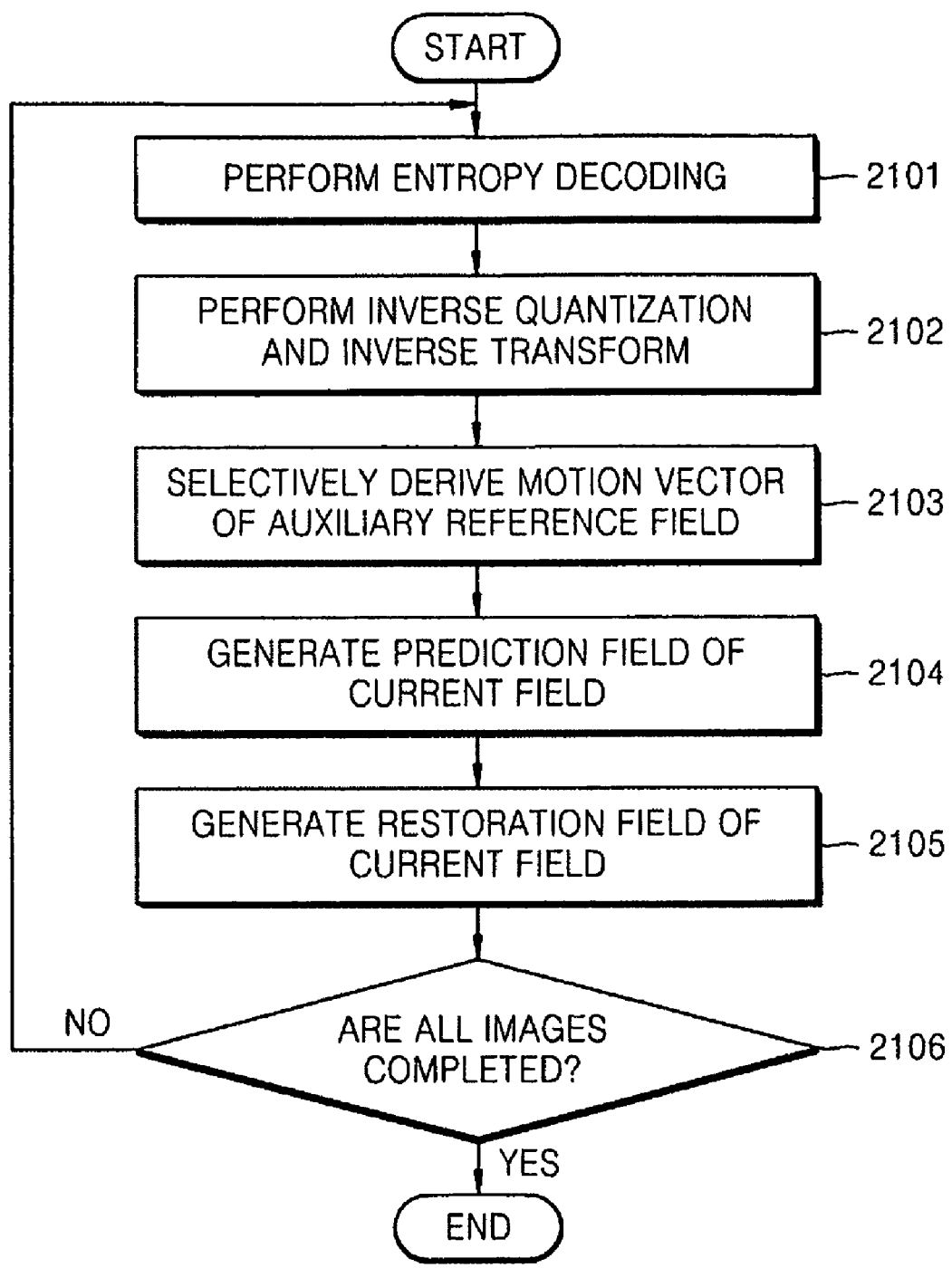
FIG. 14 is a flowchart illustrating operations of an image decoding method according to another embodiment.

FIG. 14 is a flowchart illustrating operations of an image decoding method according to another embodiment.

Referring to FIG. 14, the image decoding method according to the current embodiment is formed with operations processed in a time series in the image decoding apparatus 200 illustrated in FIG. 8. Accordingly, though omitted hereinafter, those explained above with reference to the image decoding apparatus 200 illustrated in FIG. 8 are also applied to the image decoding method according to the current embodiment. In particular, the image decoding method illustrated in FIG. 13 is for a case where an image is decoded according to an interlace scanning method.

In operation 2101, the image decoding apparatus 200 entropy-decodes a bitstream transmitted from the image encoding apparatus illustrated in FIG. 2, thereby restoring integer values corresponding to the quantization result of the residue field between a current field and a prediction field and encoding information of the current field. In operation 2102, the image decoding apparatus 200 inverse-quantizes the integer values restored in operation 2101, thereby restoring frequency coefficients of the residue field between the current field and the prediction field, and by transforming the frequency coefficients from the frequency space to the color space, the image decoding apparatus 200 restores the residue field between the current field and the prediction field.

In operation 2103, based on the position of an auxiliary reference field included in the information restored in operation 2101, the image decoding apparatus 200 selectively derives a motion vector of the auxiliary reference field corresponding to the position from the motion vector of the main reference field included in this information. In operation 2104, the image decoding apparatus 200 generates a prediction field of the current field from at least one reference field from among reference fields stored in the buffer 206 by using the motion vector of the main reference field or the auxiliary reference field. In operation 2105, the image decoding apparatus 200 adds the residue field restored in operation 2102 to the prediction field generated in operation 2104, thereby generating a restoration field of the current field and storing this restoration field in the buffer 206.

In operation 2106, if operations 2101 through 2105 described above are performed for all of a series of images corresponding to a set of moving pictures, the image decoding apparatus 200 finishes the operation, or else operation 2001 is performed again.

Figure 15:
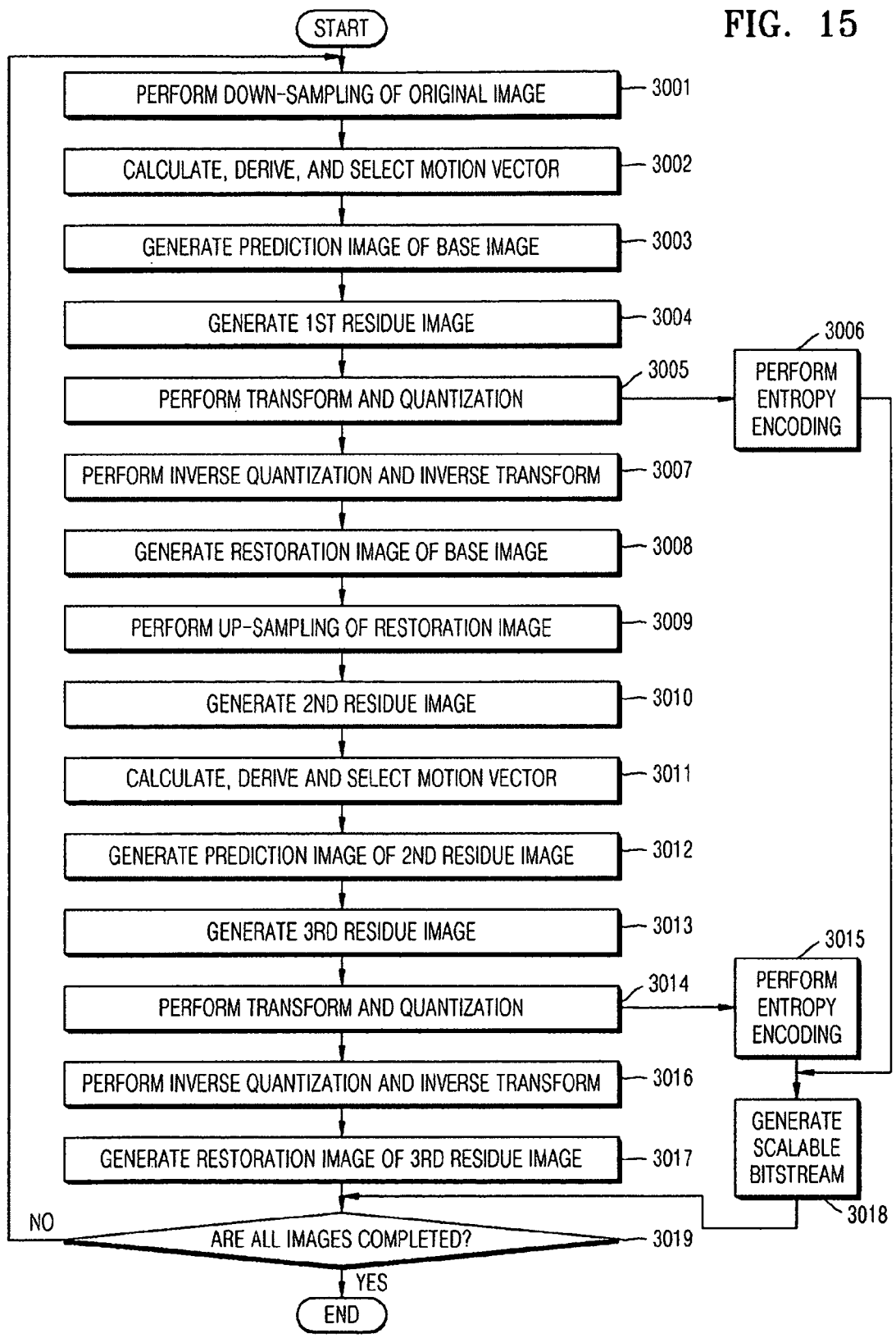
FIG. 15 is a flowchart illustrating operations of an image encoding method according to another embodiment.

FIG. 15 is a flowchart illustrating operations of an image encoding method according to another embodiment.

Referring to FIG. 15, the image encoding method according to the current embodiment is formed with operations processed in a time series in the image encoding apparatus 300 illustrated in FIG. 9. Accordingly, though omitted hereinafter, those explained above with reference to the image encoding apparatus 300 illustrated in FIG. 9 are also applied to the image encoding method according to the current embodiment. In particular, the image encoding method illustrated in FIG. 14 is for a case where an image is encoded according to a progressive scanning method.

In operation 3001, the image encoding apparatus 300 down-samples an original image currently input to the image encoding apparatus 300 from among a series of original images corresponding to moving pictures, thereby generating a base image.

In operation 3002, the image encoding apparatus 300 estimates the motion of the base image generated in operation 3001 with reference to a main reference image from among reference images stored in the first buffer 311, thereby calculating a motion vector of the main reference image, and derives a motion vector of an auxiliary reference image from the motion vector of this main reference image. Also, the image encoding apparatus 300 compares the compression ratio of the base image according to the motion vector of the main reference image with the compression ratio of the base image according to the motion vector of the auxiliary reference image, and according to the comparison result, the image encoding apparatus 300 selects any one of the motion vectors of the main reference image and the auxiliary reference image.

In operation 3003, the image encoding apparatus 300 generates a prediction image of the base image from at least one reference image from among the reference images stored in the buffer 311 by using the motion vector of the main reference image or the motion vector of the auxiliary reference image selected in operation 3002. In operation 3004, the image encoding apparatus 300 subtracts the prediction image generated in operation 3003 from the base image, thereby generating the residue image (hereinafter simply referred to as a "first residue image") between the base image and the prediction image.

In operation 3005, the image encoding apparatus 300 transforms the first residue image generated in operation 3004, from the color space to the frequency space, thereby generating frequency coefficients of the first residue image and quantizing the frequency coefficients. In operation 3006, the image encoding apparatus 300 entropy-encodes integer values corresponding to the result quantized in operation 3005 and encoding information of the base image, thereby generating a bitstream.

In operation 3007, the image encoding apparatus 300 inverse-quantizes the integer values corresponding to the result quantized in operation 3005, thereby restoring frequency coefficients of the first residue image, and by transforming these frequency coefficients from the frequency space to the color space, the image encoding apparatus 300 restores the first residue image. In operation 3008, the image encoding apparatus 300 adds the first residue image restored in operation 3007 to the prediction image generated in operation 3003, thereby generating a restoration image of the base image and storing this restoration image in the first buffer 311.

In operation 3009, the image encoding apparatus 300 up-samples the restoration image generated in operation 3008.

In operation 3010, the image encoding apparatus 300 subtracts the restoration image up-sampled in operation 3009 from the original image currently input to the image encoding apparatus 300, thereby generating the residue image (hereinafter simply referred to as a "second residue image") between the original image and the restoration image up-sampled in operation 3009.

In operation 3011, the image encoding apparatus 300 estimates the motion of the second residue image generated in operation 3010 with reference to a main reference image from among reference images stored in the second buffer 323, thereby calculating a motion vector of the main reference image, and derives a motion vector of an auxiliary reference image from the motion vector of this main reference image. Also, the image encoding apparatus 300 compares the compression ratio of the base image according to the motion vector of the main reference image with the compression ratio of the second residue image according to the motion vector of the auxiliary reference image, and according to the comparison result, the image encoding apparatus 300 selects any one of the motion vectors of the main reference image and the auxiliary reference image.

In operation 3012, the image encoding apparatus 300 generates a prediction image of the second residue image from at least one reference image from among the reference images stored in the second buffer 323 by using the motion vector of the main reference image or the motion vector of the auxiliary reference image selected in operation 3011. In operation 3013, the image encoding apparatus 300 subtracts the prediction image generated in operation 3010 from the second residue image generated in operation 3012, thereby generating the residue image (hereinafter simply referred to as a "third residue image") between the second residue image and the prediction image.

In operation 3014, the image encoding apparatus 300 transforms the third residue image generated in operation 3013, from the color space to the frequency space, thereby generating frequency coefficients of the third residue image and quantizing the frequency coefficients, by using a quantization parameter. In operation 3015, the image encoding apparatus 300 entropy-encodes integer values corresponding to the result quantized in operation 3014 and image information, thereby generating an enhancement layer bitstream.

In operation 3016, the image encoding apparatus 300 inverse-quantizes the integer values corresponding to the result quantized in operation 3014, thereby restoring frequency coefficients of the third residue image, and by transforming these frequency coefficients from the frequency space to the color space, the image encoding apparatus 300 restores the third residue image. In operation 3017, the image encoding apparatus 300 adds the third residue image restored in operation 3016 to the prediction image generated in operation 3012, thereby generating a restoration image of the second reside image and storing this restoration image in the second buffer 323.

In operation 3018, the image encoding apparatus 300 combines the base layer bitstream generated in operation 3006 and the enhancement layer bitstream generated in operation 3015, thereby generating a scalable bitstream.

In operation 3019, if operations 3001 through 3018 described above are performed for all of a series of images corresponding to a set of moving pictures, the image encoding apparatus 300 finishes the operation, or else operation 3001 is performed again.

Figure 16:
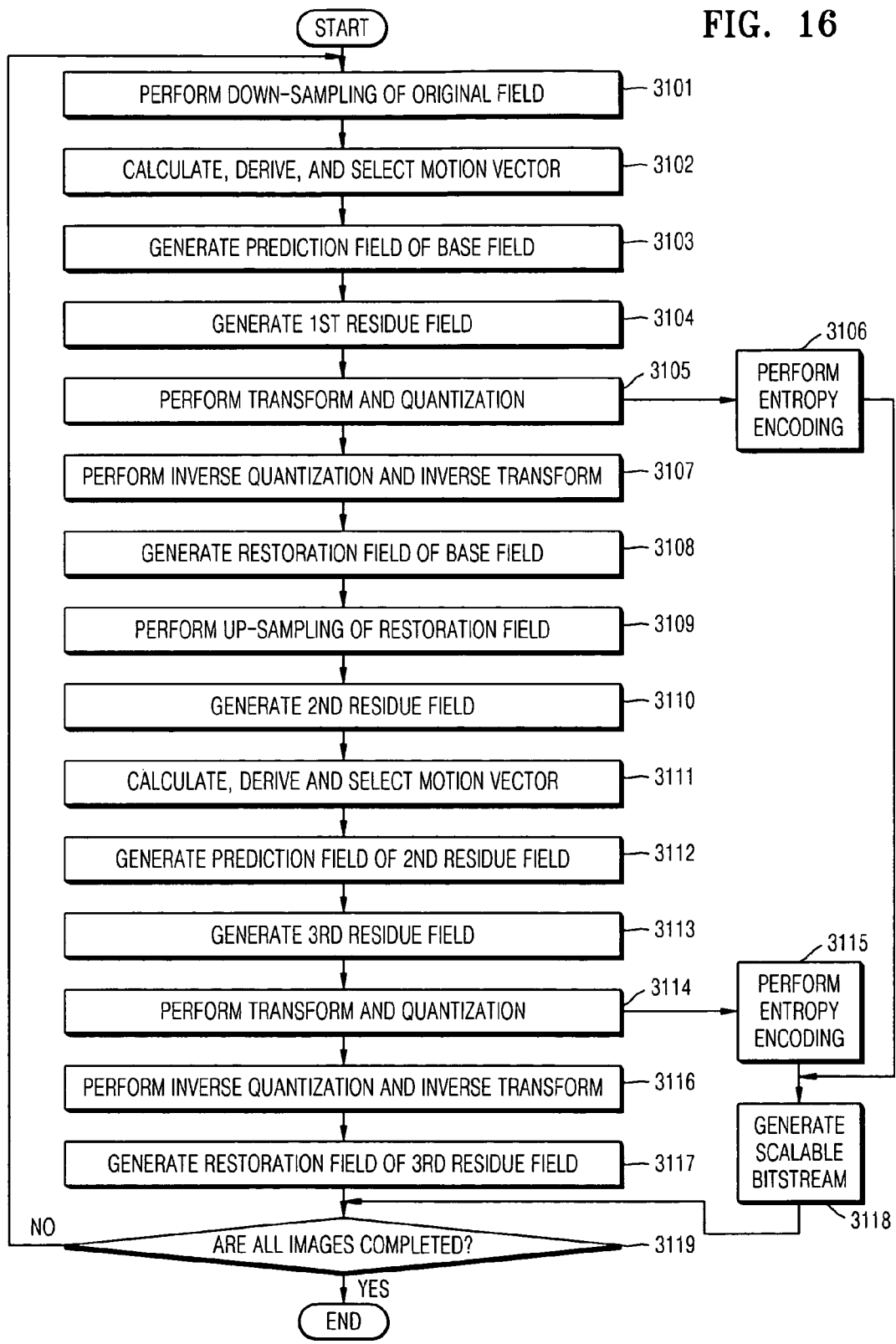
FIG. 16 is a flowchart illustrating operations of an image encoding method according to another embodiment.

FIG. 16 is a flowchart illustrating operations of an image encoding method according to another embodiment.

Referring to FIG. 16, the image encoding method according to the current embodiment is formed with operations processed in a time series in the image encoding apparatus 300 illustrated in FIG. 9. Accordingly, though omitted hereinafter, those explained above with reference to the image encoding apparatus 300 illustrated in FIG. 9 are also applied to the image encoding method according to the current embodiment. In particular, the image encoding method illustrated in FIG. 16 is for a case where an image is encoded according to an interlace scanning method.

In operation 3101, the image encoding apparatus 300 down-samples an original field corresponding to half of an original image currently input to the image encoding apparatus 300 from among a series of original images corresponding to a set of moving pictures, thereby generating a base field.

In operation 3102, the image encoding apparatus 300 estimates the motion of the base field generated in operation 3101 with reference to a main reference field from among reference fields stored in the first buffer 311, thereby calculating a motion vector of the main reference field, and derives a motion vector of an auxiliary reference field from the motion vector of this main reference image. Also, the image encoding apparatus 300 compares the compression ratio of the base field according to the motion vector of the main reference field with the compression ratio of the base field according to the motion vector of the auxiliary reference field, and according to the comparison result, the image encoding apparatus 300 selects any one of the motion vectors of the main reference field and the auxiliary reference field.

In operation 3103, the image encoding apparatus 300 generates a prediction field of the base field from at least one reference field from among the reference fields stored in the buffer 311 by using the motion vector of the main reference field or the motion vector of the auxiliary reference field selected in operation 3102. In operation 3104, the image encoding apparatus 300 subtracts the prediction field generated in operation 3103 from the base field, thereby generating the residue field (hereinafter simply referred to as a "first residue field") between the base field and the prediction field.

In operation 3105, the image encoding apparatus 300 transforms the first residue field generated in operation 3104 from the color space to the frequency space, thereby generating frequency coefficients of the first residue field and quantizing the frequency coefficients. In operation 3106, the image encoding apparatus 300 entropy-encodes integer values corresponding to the result quantized in operation 3105 and encoding information of the base field, thereby generating a bitstream.

In operation 3107, the image encoding apparatus 300 inverse-quantizes the integer values corresponding to the result quantized in operation 3105, thereby restoring frequency coefficients of the first residue field, and by transforming these frequency coefficients from the frequency space to the color space, the image encoding apparatus 300 restores the first residue field. In operation 3108, the image encoding apparatus 300 adds the first residue field restored in operation 3107 to the prediction field generated in operation 3103, thereby generating a restoration field of the base field and storing this restoration field in the first buffer 311.

In operation 3109, the image encoding apparatus 300 up-samples the restoration field generated in operation 3108.

In operation 3110, the image encoding apparatus 300 subtracts the restoration field up-sampled in operation 3109 from the original field currently input to the image encoding apparatus 300, thereby generating the residue field (hereinafter simply referred to as a "second residue field") between the original field and the restoration field up-sampled in operation 3109.

In operation 3111, the image encoding apparatus 300 estimates the motion of the second residue field generated in operation 3110 with reference to a main reference field from among reference fields stored in the second buffer 323, thereby calculating a motion vector of the main reference field, and derives a motion vector of an auxiliary reference field from the motion vector of this main reference field. Also, the image encoding apparatus 300 compares the compression ratio of the base field according to the motion vector of the main reference field with the compression ratio of the second residue field according to the motion vector of the auxiliary reference field, and according to the comparison result, the image encoding apparatus 300 selects any one of the motion vectors of the main reference field and the auxiliary reference field.

In operation 3112, the image encoding apparatus 300 generates a prediction field of the second residue field from at least one reference field from among the reference fields stored in the second buffer 323 by using the motion vector of the main reference field or the motion vector of the auxiliary reference field selected in operation 3111. In operation 3113, the image encoding apparatus 300 subtracts the prediction field generated in operation 3110 from the second residue field generated in operation 3112, thereby generating the residue field (hereinafter simply referred to as a "third residue field") between the second residue field and the prediction field.

In operation 3114, the image encoding apparatus 300 transforms the third residue field generated in operation 3113 from the color space to the frequency space, thereby generating frequency coefficients of the third residue field and quantizing the frequency coefficients by using a quantization parameter. In operation 3115, the image encoding apparatus 300 entropy-encodes integer values corresponding to the result quantized in operation 3114 and encoding information of the second residue field, thereby generating an enhancement layer bitstream.

In operation 3116, the image encoding apparatus 300 inverse-quantizes the integer values corresponding to the result quantized in operation 3114, thereby restoring frequency coefficients of the third residue field, and by transforming these frequency coefficients from the frequency space to the color space, the image encoding apparatus 300 restores the third residue field. In operation 3117, the image encoding apparatus 300 adds the third residue field restored in operation 3116 to the prediction field generated in operation 3112, thereby generating a restoration field of the second residue field and storing this restoration field in the second buffer 323.

In operation 3118, the image encoding apparatus 300 combines the base layer bitstream generated in operation 3106 and the enhancement layer bitstream generated in operation 3115, thereby generating a scalable bitstream.

In operation 3119, if operations 3101 through 3118 described above are performed for all of a series of images corresponding to a set of moving pictures, the image encoding apparatus 300 finishes the operation, or else operation 3101 is performed again.

Figure 17:
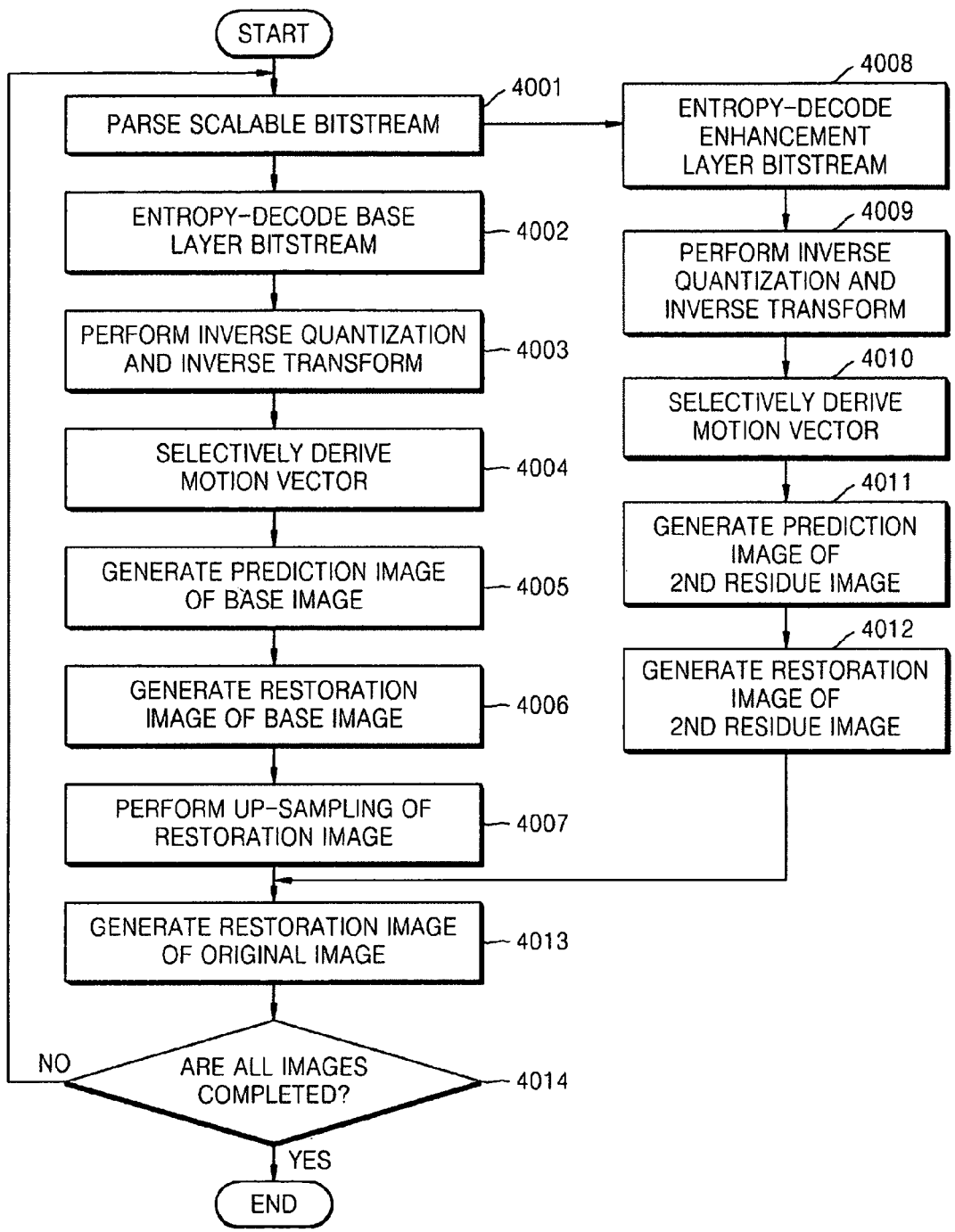
FIG. 17 is a flowchart illustrating operations of an image decoding method according to another embodiment.

FIG. 17 is a flowchart illustrating operations of an image decoding method according to another embodiment.

Referring to FIG. 17, the image decoding method according to the current embodiment is formed with operations processed in a time series in the image decoding apparatus 400 illustrated in FIG. 10. Accordingly, though omitted hereinafter, those explained above with reference to the image decoding apparatus 400 illustrated in FIG. 10 are also applied to the image decoding method according to the current embodiment. In particular, the image decoding method illustrated in FIG. 17 is for a case where an image is decoded according to a progressive scanning method.

In operation 4001, the image decoding apparatus 400 parses a scalable bitstream transmitted from the image encoding apparatus 300 illustrated in FIG. 9, thereby extracting a base layer bitstream and an enhancement layer bitstream from this scalable bitstream.

In operation 4002, the image decoding apparatus 300 entropy-decodes the base layer bitstream extracted in operation 4001, thereby restoring integer values corresponding to the quantization result of the residue image (hereinafter simply referred to as a "first residue image") between a base image and a prediction image, and information to decode a base image. In operation 4003, the image decoding apparatus 400 inverse-quantizes the integer values restored in operation 4002, thereby restoring frequency coefficients of the first residue image, and by transforming these frequency coefficients from the frequency space to the color space, the image decoding apparatus 400 restores the first residue image.

In operation 4004, based on the position of an auxiliary reference image included in the information restored in operation 4003, the image decoding apparatus 400 selectively derives a motion vector of the auxiliary reference image corresponding to the position from a motion vector of a main reference image included in this information. In operation 4005, the image decoding apparatus 400 generates a prediction image of the base image from at least one reference image from among reference images stored in the first buffer 407. In operation 4006, the image decoding apparatus 400 adds the first residue image restored in the operation 4003 to the prediction image generated in operation 4005, thereby generating a restoration image of the base image, and storing this restoration image in the first buffer 407.

In operation 4007, the image decoding apparatus 400 up-samples the restoration image generated in operation 4006.

In operation 4008, the image decoding apparatus 400 entropy-encodes the enhancement layer bitstream extracted in operation 4001, thereby restoring the integer values corresponding to the quantization result of the residue image (hereinafter simply referred to as a "third residue image") between the residue image (hereinafter simply referred to as a "second residue image"), which is between the original image and the restoration image up-sampled in operation 4007, and the prediction image, and encoding information of the third residue image. In operation 4009, the image decoding apparatus 400 inverse-quantizes the integer values restored in operation 4008 by using a quantization parameter, thereby restoring frequency coefficients of the third residue image, and by transforming these frequency coefficients, the image decoding apparatus 400 restores the third residue image.

In operation 4010, based on the position of the auxiliary reference image included in the information restored in operation 4008, the image decoding apparatus 400 selectively derives a motion vector of the auxiliary reference image corresponding to the position from the motion vector of the main reference image included in the information. In operation 4011, the image decoding apparatus 400 generates a prediction image of the second residue image from at least one reference image from among reference images stored in the second buffer 414 by using the motion vector of the main reference image or the motion vector of the auxiliary reference image.

In operation 4012, the image decoding apparatus 400 adds the prediction image generated in operation 4011 to the third residue image restored in operation 4009, thereby generating a restoration image of the second residue image and storing this restoration image in the second buffer 414. In operation 4013, the image decoding apparatus 400 adds the restoration image generated in operation 4012 to the restoration image up-sampled in operation 4007, thereby generating a restoration image of the original image.

In operation 4014, if operations 4001 through 4013 described above are performed for all of a series of images corresponding to a set of moving pictures, the image decoding apparatus 400 finishes the operation, or else operation 4001 is performed again.

Figure 18:
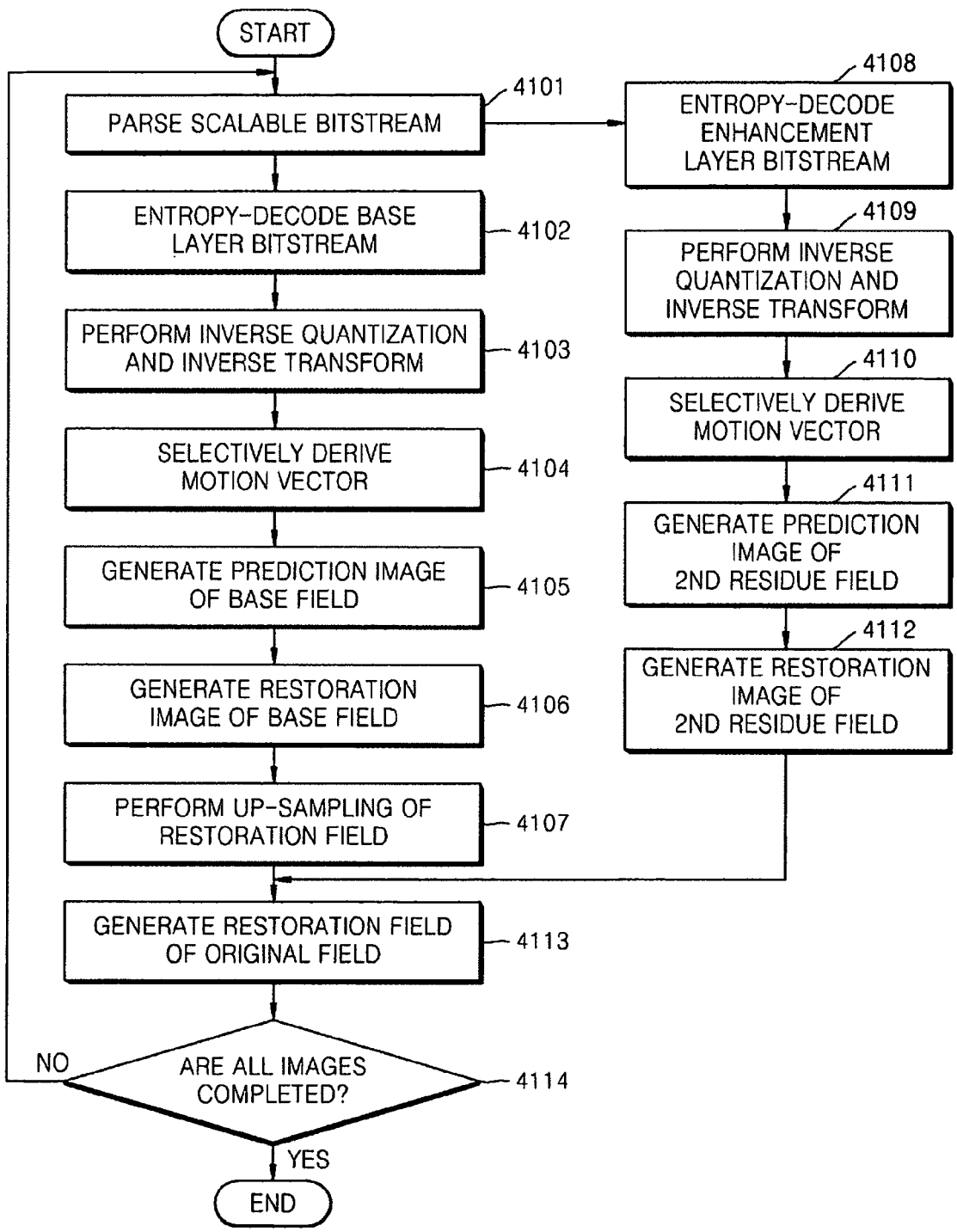
FIG. 18 is a flowchart illustrating operations of an image decoding method according to another embodiment.

FIG. 18 is a flowchart illustrating operations of an image decoding method according to another embodiment.

Referring to FIG. 18, the image decoding method according to the current embodiment is formed with operations processed in a time series in the image decoding apparatus 400 illustrated in FIG. 10. Accordingly, though omitted hereinafter, those explained above with reference to the image decoding apparatus 400 illustrated in FIG. 10 are also applied to the image decoding method according to the current embodiment. In particular, the image decoding method illustrated in FIG. 17 is for a case where an image is decoded according to an interlace scanning method.

In operation 4101, the image decoding apparatus 400 parses a scalable bitstream transmitted from the image encoding apparatus 300 illustrated in FIG. 9, thereby extracting a base layer bitstream and an enhancement layer bitstream from this scalable bitstream.

In operation 4102, the image decoding apparatus 300 entropy-decodes the base layer bitstream extracted in operation 4001, thereby restoring integer values corresponding to the quantization result of the residue field (hereinafter simply referred to as a "first residue field") between a base field and a prediction field, and information to decode a base field. In operation 4103, the image decoding apparatus 400 inverse-quantizes the integer values restored in operation 4102, thereby restoring frequency coefficients of the first residue field, and by transforming these frequency coefficients from the frequency space to the color space, the image decoding apparatus 400 restores the first residue field.

In operation 4104, based on the position of an auxiliary reference field included in the information restored in operation 4102, the image decoding apparatus 400 selectively derives a motion vector of the auxiliary reference field corresponding to the position from a motion vector of a main reference field included in this information. In operation 4105, the image decoding apparatus 400 generates a prediction field of the base field from at least one reference field from among reference fields stored in the first buffer 407. In operation 4106, the image decoding apparatus 400 adds the first residue field restored in the operation 4103 to the prediction field generated in operation 4105, thereby generating a restoration field of the base field, and storing this restoration field in the first buffer 407.

In operation 4107, the image decoding apparatus 400 up-samples the restoration field generated in operation 4106.

In operation 4108, the image decoding apparatus 400 entropy-decodes the enhancement layer bitstream extracted in operation 4101, thereby restoring the integer values corresponding to the quantization result of the residue field (hereinafter simply referred to as a "third residue field") between the residue field (hereinafter simply referred to as a "second residue field"), which is between the original field and the restoration field up-sampled in operation 4007, and the prediction field, and encoding information of the third residue field. In operation 4109, the image decoding apparatus 400 inverse-quantizes the integer values restored in operation 4108 by using a quantization parameter, thereby restoring frequency coefficients of the third residue field, and by transforming these frequency coefficients, the image decoding apparatus 400 restores the third residue field.

In operation 4110, based on the position of the auxiliary reference field included in the information restored in operation 4108, the image decoding apparatus 400 selectively derives a motion vector of the auxiliary reference field corresponding to the position from the motion vector of the main reference field included in the information. In operation 4111, the image decoding apparatus 400 generates a prediction field of the second residue field from at least one reference field from among reference fields stored in the second buffer 414 by using the motion vector of the main reference field or the motion vector of the auxiliary reference field.

In operation 4112, the image decoding apparatus 400 adds the prediction field generated in operation 4111 to the third residue field restored in operation 4109, thereby generating a restoration field of the second residue field and storing this restoration field in the second buffer 414. In operation 4113, the image decoding apparatus 400 adds the restoration field generated in operation 4112 to the restoration field up-sampled in operation 4107, thereby generating a restoration field of the original field.

In operation 4114, if operations 4101 through 4113 described above are performed for all of a series of images corresponding to a set of moving pictures, the image decoding apparatus 400 finishes the operation, or else operation 4101 is performed again.

In addition to the above described embodiments, embodiments of the present invention can also be implemented through computer-readable code/instructions in/on a medium, e.g., a computer readable medium, to control at least one processing element to implement any above described embodiment. The medium can correspond to any medium/media permitting the storing and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), for example. The media may also be a distributed network, so that the computer-readable code is stored/transferred and executed in a distributed fashion. Still further, as only an example, the processing element could include a processor or a computer processor, and processing elements may be distributed and/or included in a single device.

While aspects of the present invention have been particularly shown and described with reference to differing embodiments thereof, it should be understood that these embodiments should be considered in a descriptive sense only and not for purposes of limitation. Any narrowing or broadening of functionality or capability of an aspect in one embodiment should not be considered as a respective broadening or narrowing of similar features in a different embodiment, i.e., descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of decoding an image, the method comprising:
restoring a residue image between a current image and a prediction image from a bitstream;
deriving a motion vector of an auxiliary reference image by using a motion vector of a main reference image;
generating a prediction image of the current image by using the motion vector of the main reference image or the motion vector of the auxiliary reference image; and
restoring the current image by adding the restored residue image to the generated prediction image, wherein the motion vector of the auxiliary reference image is derived by linearly transforming the motion vector of the main reference image.

2. The method of claim 1, wherein the motion vector of the main reference image is linearly transformed based on a relationship of a temporal distance among the current image, the auxiliary reference image and the main reference image.

3. The method of claim 1, further comprising restoring encoding information of the current image from the bitstream, the motion vector of the auxiliary reference image being derived by linearly transforming the motion vector of the main reference image selectively based on a position of the auxiliary reference image included in the restored information.

* * * * *